United States Patent [19]

Padovani et al.

[11] Patent Number: 5,504,773
[45] Date of Patent: Apr. 2, 1996

[54] METHOD AND APPARATUS FOR THE FORMATTING OF DATA FOR TRANSMISSION

[75] Inventors: Roberto Padovani; Edward G. Tiedemann, Jr.; Lindsay A. Weaver, Jr., all of San Diego; Brian K. Butler, Cardiff, all of Calif.

[73] Assignee: Qualcomm Incorporated, San Diego, Calif.

[21] Appl. No.: 171,146

[22] Filed: Dec. 21, 1993

Related U.S. Application Data

[63] Continuation of Ser. No. 822,164, Jan. 16, 1992, abandoned, which is a continuation-in-part of Ser. No. 543,496, Jun. 25, 1990, Pat. No. 5,103,459.

[51] Int. Cl.$^6$ .............................. H04B 1/69; G06F 11/00
[52] U.S. Cl. ............................. 375/200; 380/34; 370/60; 370/94.1; 370/99; 371/2.1; 371/43; 371/49.2
[58] Field of Search .................... 375/1, 38, 200–210, 375/260; 380/34; 370/60, 94.1, 99, 24; 371/2.1, 37.1, 37.7, 43, 49.2

[56] References Cited

U.S. PATENT DOCUMENTS

| | | | |
|---|---|---|---|
| 4,291,409 | 9/1981 | Weinberg et al. | 375/347 |
| 4,980,897 | 12/1990 | Decker et al. | 375/38 |
| 5,003,533 | 3/1991 | Watanabe | 370/94.1 X |
| 5,068,849 | 11/1991 | Tanaka | 370/94.1 X |
| 5,212,684 | 5/1993 | MacNamee et al. | 370/24 |

FOREIGN PATENT DOCUMENTS

| | | | |
|---|---|---|---|
| 0412583 | 3/1986 | European Pat. Off. | H04B 1/56 |
| 0418865 | 9/1990 | European Pat. Off. | H04L 12/56 |
| 0444592 | 2/1991 | European Pat. Off. | H04B 7/212 |
| 2022365 | 12/1979 | United Kingdom | H04Q 7/04 |
| 2182528 | 5/1987 | United Kingdom | H04J 3/16 |
| 9107030 | 5/1991 | WIPO | H04J 3/06 |

OTHER PUBLICATIONS

D. W. Davies, *Security For Computer Networks*; (John Wiley & Sons, 1984), p. 362.
Supplementary European Search Report Dated Nov. 11, 1994.

*Primary Examiner*—Bernarr E. Gregory
*Attorney, Agent, or Firm*—Russell B. Miller; Sean English

[57] ABSTRACT

In a digital communication system in which digital data is transmitted in data frames of a preselected time duration, a method and apparatus for formatting digital data in each data frame. A set of data bits of a first data type having a bit count corresponding to one of a plurality of predetermined bit counts are provided. A set of parity check bits for the set of data bits of said first data type are generated when the bit count is a highest bit count or a next to highest bit count. A set of tail bits is generated in accordance with a predetermined frame termination format. In respective order the set of data bits of the first data type, the parity check bits, and the tail bits are porovided in a data frame if the bit count is of the highest bit count or of the next to highest bit count. Otherwise, the set of data bits of the first data type and the tail bits are provided in respective order in the data frame.

26 Claims, 18 Drawing Sheets

PRIMARY TRAFFIC ONLY (9.6 KBPS)

DIM AND BURST WITH PRIMARY AND SIGNALING TRAFFIC (9.6 KBPS)

DIM AND BURST WITH PRIMARY AND SECONDARY TRAFFIC (9.6 KBPS)

BLANK AND BURST WITH SIGNALING TRAFFIC ONLY (9.6 KBPS)

BLANK AND BURST WITH SECONDARY TRAFFIC ONLY (9.6 KBPS)

4.8 KBPS
FRAME
FORMAT 2.4 KBPS
FRAME
FORMAT 1.2 KBPS
FRAME
FORMAT

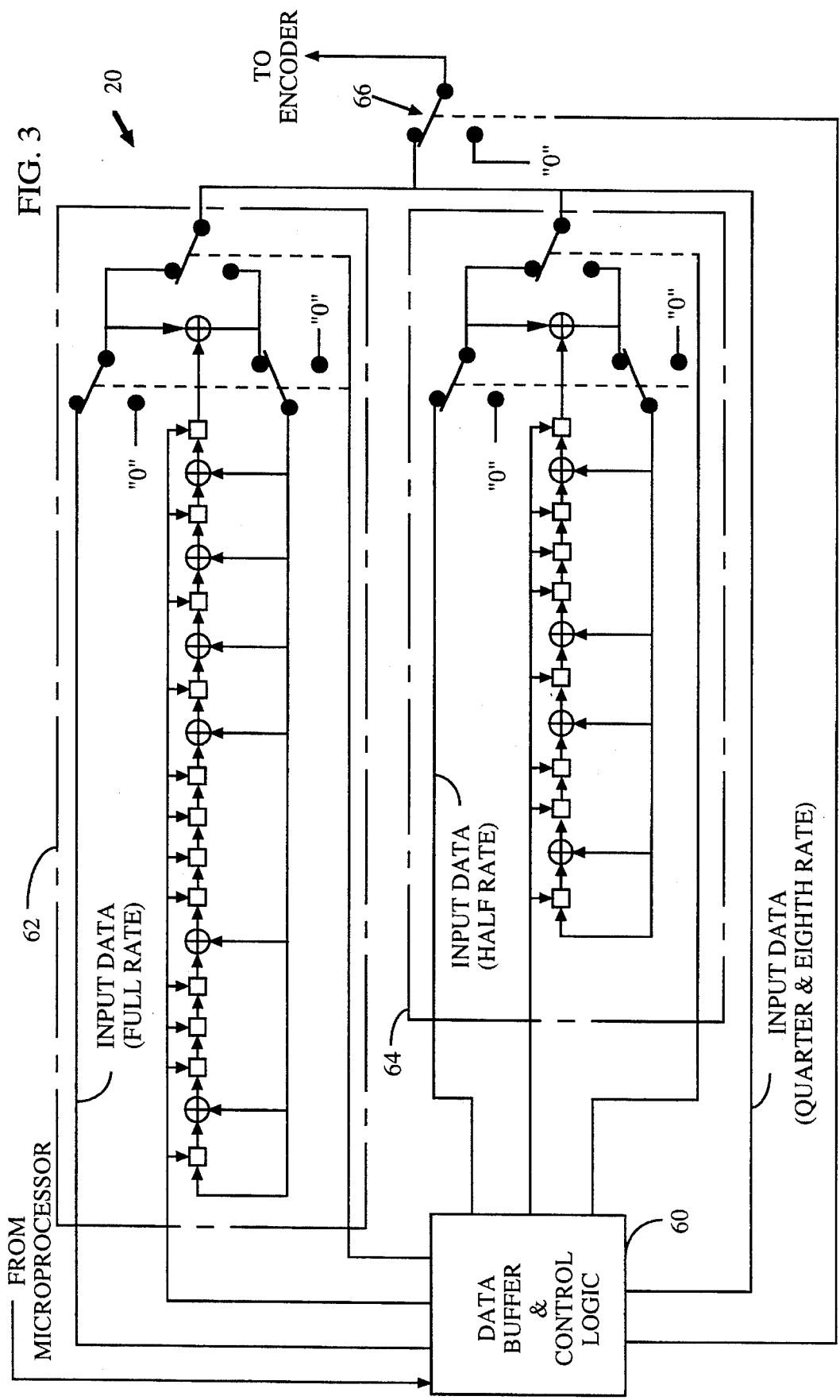

| | | | | | | | | | | | | | | | | | |
|---|---|---|---|---|---|---|---|---|---|---|---|---|---|---|---|---|---|
| 1 | 33 | 65 | 97 | 129 | 161 | 193 | 225 | 257 | 289 | 321 | 353 | 385 | 417 | 449 | 481 | 513 | 545 |
| 2 | 34 | 66 | 98 | 130 | 162 | 194 | 226 | 258 | 290 | 322 | 354 | 386 | 418 | 450 | 482 | 514 | 546 |
| 3 | 35 | 67 | 99 | 131 | 163 | 195 | 227 | 259 | 291 | 323 | 355 | 387 | 419 | 451 | 483 | 515 | 547 |
| 4 | 36 | 68 | 100 | 132 | 164 | 196 | 228 | 260 | 292 | 324 | 356 | 388 | 420 | 452 | 484 | 516 | 548 |
| 5 | 37 | 69 | 101 | 133 | 165 | 197 | 229 | 261 | 293 | 325 | 357 | 389 | 421 | 453 | 485 | 517 | 549 |
| 6 | 38 | 70 | 102 | 134 | 166 | 198 | 230 | 262 | 294 | 326 | 358 | 390 | 422 | 454 | 486 | 518 | 550 |
| 7 | 39 | 71 | 103 | 135 | 167 | 199 | 231 | 263 | 295 | 327 | 359 | 391 | 423 | 455 | 487 | 519 | 551 |
| 8 | 40 | 72 | 104 | 136 | 168 | 200 | 232 | 264 | 296 | 328 | 360 | 392 | 424 | 456 | 488 | 520 | 552 |
| 9 | 41 | 73 | 105 | 137 | 169 | 201 | 233 | 265 | 297 | 329 | 361 | 393 | 425 | 457 | 489 | 521 | 553 |
| 10 | 42 | 74 | 106 | 138 | 170 | 202 | 234 | 266 | 298 | 330 | 362 | 394 | 426 | 458 | 490 | 522 | 554 |
| 11 | 43 | 75 | 107 | 139 | 171 | 203 | 235 | 267 | 299 | 331 | 363 | 395 | 427 | 459 | 491 | 523 | 555 |
| 12 | 44 | 76 | 108 | 140 | 172 | 204 | 236 | 268 | 300 | 332 | 364 | 396 | 428 | 460 | 492 | 524 | 556 |
| 13 | 45 | 77 | 109 | 141 | 173 | 205 | 237 | 269 | 301 | 333 | 365 | 397 | 429 | 461 | 493 | 525 | 557 |
| 14 | 46 | 78 | 110 | 142 | 174 | 206 | 238 | 270 | 302 | 334 | 366 | 398 | 430 | 462 | 494 | 526 | 558 |
| 15 | 47 | 79 | 111 | 143 | 175 | 207 | 239 | 271 | 303 | 335 | 367 | 399 | 431 | 463 | 495 | 527 | 559 |
| 16 | 48 | 80 | 112 | 144 | 176 | 208 | 240 | 272 | 304 | 336 | 368 | 400 | 432 | 464 | 496 | 528 | 560 |
| 17 | 49 | 81 | 113 | 145 | 177 | 209 | 241 | 273 | 305 | 337 | 369 | 401 | 433 | 465 | 497 | 529 | 561 |
| 18 | 50 | 82 | 114 | 146 | 178 | 210 | 242 | 274 | 306 | 338 | 370 | 402 | 434 | 466 | 498 | 530 | 562 |
| 19 | 51 | 83 | 115 | 147 | 179 | 211 | 243 | 275 | 307 | 339 | 371 | 403 | 435 | 467 | 499 | 531 | 563 |
| 20 | 52 | 84 | 116 | 148 | 180 | 212 | 244 | 276 | 308 | 340 | 372 | 404 | 436 | 468 | 500 | 532 | 564 |
| 21 | 53 | 85 | 117 | 149 | 181 | 213 | 245 | 277 | 309 | 341 | 373 | 405 | 437 | 469 | 501 | 533 | 565 |
| 22 | 54 | 86 | 118 | 150 | 182 | 214 | 246 | 278 | 310 | 342 | 374 | 406 | 438 | 470 | 502 | 534 | 566 |
| 23 | 55 | 87 | 119 | 151 | 183 | 215 | 247 | 279 | 311 | 343 | 375 | 407 | 439 | 471 | 503 | 535 | 567 |
| 24 | 56 | 88 | 120 | 152 | 184 | 216 | 248 | 280 | 312 | 344 | 376 | 408 | 440 | 472 | 504 | 536 | 568 |
| 25 | 57 | 89 | 121 | 153 | 185 | 217 | 249 | 281 | 313 | 345 | 377 | 409 | 441 | 473 | 505 | 537 | 569 |
| 26 | 58 | 90 | 122 | 154 | 186 | 218 | 250 | 282 | 314 | 346 | 378 | 410 | 442 | 474 | 506 | 538 | 570 |
| 27 | 59 | 91 | 123 | 155 | 187 | 219 | 251 | 283 | 315 | 347 | 379 | 411 | 443 | 475 | 507 | 539 | 571 |
| 28 | 60 | 92 | 124 | 156 | 188 | 220 | 252 | 284 | 316 | 348 | 380 | 412 | 444 | 476 | 508 | 540 | 572 |
| 29 | 61 | 93 | 125 | 157 | 189 | 221 | 253 | 285 | 317 | 349 | 381 | 413 | 445 | 477 | 509 | 541 | 573 |
| 30 | 62 | 94 | 126 | 158 | 190 | 222 | 254 | 286 | 318 | 350 | 382 | 414 | 446 | 478 | 510 | 542 | 574 |
| 31 | 63 | 95 | 127 | 159 | 191 | 223 | 255 | 287 | 319 | 351 | 383 | 415 | 447 | 479 | 511 | 543 | 575 |
| 32 | 64 | 96 | 128 | 160 | 192 | 224 | 256 | 288 | 320 | 352 | 384 | 416 | 448 | 480 | 512 | 544 | 576 |

FIG. 5a

| | | | | | | | | | | | | | | | | |
|---|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 | 257 | 273 |
| 1 | 17 | 33 | 49 | 65 | 81 | 97 | 113 | 129 | 145 | 161 | 177 | 193 | 209 | 225 | 241 | 257 | 273 |
| 2 | 18 | 34 | 50 | 66 | 82 | 98 | 114 | 130 | 146 | 162 | 178 | 194 | 210 | 226 | 242 | 258 | 274 |
| 2 | 18 | 34 | 50 | 66 | 82 | 98 | 114 | 130 | 146 | 162 | 178 | 194 | 210 | 226 | 242 | 258 | 274 |
| 3 | 19 | 35 | 51 | 67 | 83 | 99 | 115 | 131 | 147 | 163 | 179 | 195 | 211 | 227 | 243 | 259 | 275 |
| 3 | 19 | 35 | 51 | 67 | 83 | 99 | 115 | 131 | 147 | 163 | 179 | 195 | 211 | 227 | 243 | 259 | 275 |
| 4 | 20 | 36 | 52 | 68 | 84 | 100 | 116 | 132 | 148 | 164 | 180 | 196 | 212 | 228 | 244 | 260 | 276 |
| 4 | 20 | 36 | 52 | 68 | 84 | 100 | 116 | 132 | 148 | 164 | 180 | 196 | 212 | 228 | 244 | 260 | 276 |
| 5 | 21 | 37 | 53 | 69 | 85 | 101 | 117 | 133 | 149 | 165 | 181 | 197 | 213 | 229 | 245 | 261 | 277 |
| 5 | 21 | 37 | 53 | 69 | 85 | 101 | 117 | 133 | 149 | 165 | 181 | 197 | 213 | 229 | 245 | 261 | 277 |
| 6 | 22 | 38 | 54 | 70 | 86 | 102 | 118 | 134 | 150 | 166 | 182 | 198 | 214 | 230 | 246 | 262 | 278 |
| 6 | 22 | 38 | 54 | 70 | 86 | 102 | 118 | 134 | 150 | 166 | 182 | 198 | 214 | 230 | 246 | 262 | 278 |
| 7 | 23 | 39 | 55 | 71 | 87 | 103 | 119 | 135 | 151 | 167 | 183 | 199 | 215 | 231 | 247 | 263 | 279 |
| 7 | 23 | 39 | 55 | 71 | 87 | 103 | 119 | 135 | 151 | 167 | 183 | 199 | 215 | 231 | 247 | 263 | 279 |
| 8 | 24 | 40 | 56 | 72 | 88 | 104 | 120 | 136 | 152 | 168 | 184 | 200 | 216 | 232 | 248 | 264 | 280 |
| 8 | 24 | 40 | 56 | 72 | 88 | 104 | 120 | 136 | 152 | 168 | 184 | 200 | 216 | 232 | 248 | 264 | 280 |
| 9 | 25 | 41 | 57 | 73 | 89 | 105 | 121 | 137 | 153 | 169 | 185 | 201 | 217 | 233 | 249 | 265 | 281 |
| 9 | 25 | 41 | 57 | 73 | 89 | 105 | 121 | 137 | 153 | 169 | 185 | 201 | 217 | 233 | 249 | 265 | 281 |
| 10 | 26 | 42 | 58 | 74 | 90 | 106 | 122 | 138 | 154 | 170 | 186 | 202 | 218 | 234 | 250 | 266 | 282 |
| 10 | 26 | 42 | 58 | 74 | 90 | 106 | 122 | 138 | 154 | 170 | 186 | 202 | 218 | 234 | 250 | 266 | 282 |
| 11 | 27 | 43 | 59 | 75 | 91 | 107 | 123 | 139 | 155 | 171 | 187 | 203 | 219 | 235 | 251 | 267 | 283 |
| 11 | 27 | 43 | 59 | 75 | 91 | 107 | 123 | 139 | 155 | 171 | 187 | 203 | 219 | 235 | 251 | 267 | 283 |
| 12 | 28 | 44 | 60 | 76 | 92 | 108 | 124 | 140 | 156 | 172 | 188 | 204 | 220 | 236 | 252 | 268 | 284 |
| 12 | 28 | 44 | 60 | 76 | 92 | 108 | 124 | 140 | 156 | 172 | 188 | 204 | 220 | 236 | 252 | 268 | 284 |
| 13 | 29 | 45 | 61 | 77 | 93 | 109 | 125 | 141 | 157 | 173 | 189 | 205 | 221 | 237 | 253 | 269 | 285 |
| 13 | 29 | 45 | 61 | 77 | 93 | 109 | 125 | 141 | 157 | 173 | 189 | 205 | 221 | 237 | 253 | 269 | 285 |
| 14 | 30 | 46 | 62 | 78 | 94 | 110 | 126 | 142 | 158 | 174 | 190 | 206 | 222 | 238 | 254 | 270 | 286 |
| 14 | 30 | 46 | 62 | 78 | 94 | 110 | 126 | 142 | 158 | 174 | 190 | 206 | 222 | 238 | 254 | 270 | 286 |
| 15 | 31 | 47 | 63 | 79 | 95 | 111 | 127 | 143 | 159 | 175 | 191 | 207 | 223 | 239 | 255 | 271 | 287 |
| 15 | 31 | 47 | 63 | 79 | 95 | 111 | 127 | 143 | 159 | 175 | 191 | 207 | 223 | 239 | 255 | 271 | 287 |
| 16 | 32 | 48 | 64 | 80 | 96 | 112 | 128 | 144 | 160 | 176 | 192 | 208 | 224 | 240 | 256 | 272 | 288 |
| 16 | 32 | 48 | 64 | 80 | 96 | 112 | 128 | 144 | 160 | 176 | 192 | 208 | 224 | 240 | 256 | 272 | 288 |

FIG. 5b

| | | | | | | | | | | | | | | | | | |
|---|---|---|---|---|---|---|---|---|---|---|---|---|---|---|---|---|---|
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |

FIG. 5c

| | | | | | | | | | | | | | | | | | |
|---|---|---|---|---|---|---|---|---|---|---|---|---|---|---|---|---|---|
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |

WALSH CHIP WITHIN SYMBOL

| WALSH SYMBOL INDEX | 0123 | 4567 | 8901 | 1111 2345 | 1111 6789 | 2222 0123 | 2222 4567 | 2222 8901 | 3333 2345 | 3333 6789 | 4444 0123 | 4444 4567 | 4444 8901 | 5555 2345 | 5555 6789 | 6666 0123 |
|---|---|---|---|---|---|---|---|---|---|---|---|---|---|---|---|---|
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |

FIG. 6b

WALSH CHIP WITHIN SYMBOL

| | | | 11 | 1111 | 1111 | 2222 | 2222 | 2233 | 3333 | 3333 | 4444 | 4444 | 4455 | 5555 | 5555 | 6666 |
|---|---|---|---|---|---|---|---|---|---|---|---|---|---|---|---|---|
| | 0123 | 4567 | 8901 | 2345 | 6789 | 0123 | 4567 | 8901 | 2345 | 6789 | 0123 | 4567 | 8901 | 2345 | 6789 | 0123 |
| 24 | 0000 | 0000 | 1111 | 1111 | 1111 | 0000 | 0000 | 1111 | 0000 | 0000 | 1111 | 1111 | 1111 | 1111 | 0000 | 0000 |
| 25 | 0101 | 0101 | 1010 | 1010 | 1010 | 0101 | 0101 | 1010 | 0101 | 0101 | 1010 | 1010 | 1010 | 1010 | 0101 | 0101 |
| 26 | 0011 | 0011 | 1100 | 1100 | 1100 | 0011 | 0011 | 1100 | 0011 | 0011 | 1100 | 1100 | 1100 | 1100 | 0011 | 0011 |
| 27 | 0110 | 0110 | 1001 | 1001 | 1001 | 0110 | 0110 | 1001 | 0110 | 0110 | 1001 | 1001 | 1001 | 1001 | 0110 | 0110 |
| 28 | 0000 | 1111 | 1111 | 0000 | 1111 | 0000 | 1111 | 1111 | 0000 | 1111 | 1111 | 0000 | 1111 | 0000 | 1111 | 1111 |
| 29 | 0101 | 1010 | 1010 | 0101 | 1010 | 0101 | 1010 | 1010 | 0101 | 1010 | 1010 | 0101 | 1010 | 0101 | 1010 | 1010 |
| 30 | 0011 | 1100 | 1100 | 0011 | 1100 | 0011 | 1100 | 1100 | 0011 | 1100 | 1100 | 0011 | 1100 | 0011 | 1100 | 1100 |
| 31 | 0110 | 1001 | 1001 | 0110 | 1001 | 0110 | 1001 | 1001 | 0110 | 1001 | 1001 | 0110 | 1001 | 0110 | 1001 | 1001 |
| 32 | 0000 | 0000 | 0000 | 0000 | 1111 | 1111 | 1111 | 1111 | 0000 | 0000 | 0000 | 0000 | 1111 | 1111 | 1111 | 1111 |
| 33 | 0101 | 0101 | 0101 | 0101 | 1010 | 1010 | 1010 | 1010 | 0101 | 0101 | 0101 | 0101 | 1010 | 1010 | 1010 | 1010 |
| 34 | 0011 | 0011 | 0011 | 0011 | 1100 | 1100 | 1100 | 1100 | 0011 | 0011 | 0011 | 0011 | 1100 | 1100 | 1100 | 1100 |
| 35 | 0110 | 0110 | 0110 | 0110 | 1001 | 1001 | 1001 | 1001 | 0110 | 0110 | 0110 | 0110 | 1001 | 1001 | 1001 | 1001 |
| 36 | 0000 | 1111 | 0000 | 1111 | 1111 | 0000 | 1111 | 0000 | 0000 | 1111 | 0000 | 1111 | 1111 | 0000 | 1111 | 0000 |
| 37 | 0101 | 1010 | 0101 | 1010 | 1010 | 0101 | 1010 | 0101 | 0101 | 1010 | 0101 | 1010 | 1010 | 0101 | 1010 | 0101 |
| 38 | 0011 | 1100 | 0011 | 1100 | 1100 | 0011 | 1100 | 0011 | 0011 | 1100 | 0011 | 1100 | 1100 | 0011 | 1100 | 0011 |
| 39 | 0110 | 1001 | 0110 | 1001 | 1001 | 0110 | 1001 | 0110 | 0110 | 1001 | 0110 | 1001 | 1001 | 0110 | 1001 | 0110 |
| 40 | 0000 | 0000 | 1111 | 1111 | 0000 | 0000 | 1111 | 1111 | 0000 | 0000 | 1111 | 1111 | 0000 | 0000 | 1111 | 1111 |
| 41 | 0101 | 0101 | 1010 | 1010 | 0101 | 0101 | 1010 | 1010 | 0101 | 0101 | 1010 | 1010 | 0101 | 0101 | 1010 | 1010 |
| 42 | 0011 | 0011 | 1100 | 1100 | 0011 | 0011 | 1100 | 1100 | 0011 | 0011 | 1100 | 1100 | 0011 | 0011 | 1100 | 1100 |
| 43 | 0110 | 0110 | 1001 | 1001 | 0110 | 0110 | 1001 | 1001 | 0110 | 0110 | 1001 | 1001 | 0110 | 0110 | 1001 | 1001 |
| 44 | 0000 | 1111 | 1111 | 0000 | 0000 | 1111 | 1111 | 0000 | 0000 | 1111 | 1111 | 0000 | 0000 | 1111 | 1111 | 0000 |
| 45 | 0101 | 1010 | 1010 | 0101 | 0101 | 1010 | 1010 | 0101 | 0101 | 1010 | 1010 | 0101 | 0101 | 1010 | 1010 | 0101 |
| 46 | 0011 | 1100 | 1100 | 0011 | 0011 | 1100 | 1100 | 0011 | 0011 | 1100 | 1100 | 0011 | 0011 | 1100 | 1100 | 0011 |
| 47 | 0110 | 1001 | 1001 | 0110 | 0110 | 1001 | 1001 | 0110 | 0110 | 1001 | 1001 | 0110 | 0110 | 1001 | 1001 | 0110 |

WALSH SYMBOL INDEX

FIG. 6c

WALSH CHIP WITHIN SYMBOL

| WALSH SYMBOL INDEX | 0123 | 4567 | 11<br>8901 | 1111<br>2345 | 1111<br>6789 | 2222<br>0123 | 2222<br>4567 | 2222<br>8901 | 3333<br>2345 | 3333<br>6789 | 4444<br>0123 | 4444<br>4567 | 4455<br>8901 | 5555<br>2345 | 5555<br>6789 | 6666<br>0123 |
|---|---|---|---|---|---|---|---|---|---|---|---|---|---|---|---|---|
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

ACCESS CHANNEL LONG CODE MASK

PUBLIC LONG CODE MASK

PRIVATE LONG CODE MASK

METHOD AND APPARATUS FOR THE FORMATTING OF DATA FOR TRANSMISSION

BACKGROUND OF THE INVENTION

1. Field of the Invention

The present application is a continuation of U.S. application Ser. No. 07/822,169, filed Jan. 16, 1992, which is a continuation-in-part application of U.S. patent application Ser. No. 07/543,496, filed Jun. 25, 1990, now U.S. Pat. No. 5,103,459, entitled "SYSTEM AND METHOD FOR GENERATING SIGNAL WAVEFORMS IN A CDMA CELLULAR TELEPHONE SYSTEM" and as such relates to the organization of data for transmission. More particularly, the present invention relates to a novel and improved method and apparatus for formatting vocoder data, non-vocoder data and signaling data for transmission.

2. Description of the Related Art

In the field of digital communications various arrangements of digital data for transmission are used. The data bits are organized according to commonly used formats for transfer over the communication medium.

It is therefore an object of the present invention to provide a data format which facilitates the communication of various types of data, and data of various rates, to be communicated in a structured form.

SUMMARY OF THE INVENTION

The present invention is a novel and improved method and system for formatting digital data for communication over a transmission medium.

In communication systems it is important to utilize a data format which permits a full communication of data between users. In a communication system, such as a code division multiple access (CDMA) communication system, in which it is desirable to communicate various types of data, and at various rates, a data format must be selected which permits maximum flexibility within a predefined structure. Furthermore to maximize resources it is desirable to permit a sharing of the format to permit different types of data to be organized together. In such situations it is necessary to structure the data in a manner in which it may be readily extracted according to the corresponding type and rate.

In accordance with the present invention a method and apparatus is provided for arranging various types of data, and at various rate, into a uniquely structured format for transmission. Data is provided as vocoder data or different types of non-vocoder data. The data is organized into frames of a predetermined time duration for transmission. The data frames are organized, depending on the data, to be at one of several data rates. Vocoder data is provided at one of several data rates and is organized in the frame according to a predetermined format. Frames may be formatted with a sharing of vocoder data with non-vocoder data to be at a highest frame data rate. Non-vocoder data may be organized so as to also be at a highest frame rate. Additional control data may be provided within the data frames to support various aspects of the transmission and recovery upon reception.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is a diagram illustrating an exemplary circuit implementation of the CRC and Tail Bit generator of FIG. 1;

FIGS. 5a–5d illustrate in a series of charts the ordering of code symbols in the interleaver array for transmission data rates of 9.6, 4.8, 2.4 and 1.2 kbps, respectively;

FIGS. 6a–6c comprise a chart illustrating the Walsh symbol corresponding to each encoder symbol group;

DETAILED DESCRIPTION OF THE PREFERRED EMBODIMENTS

Figure 1:
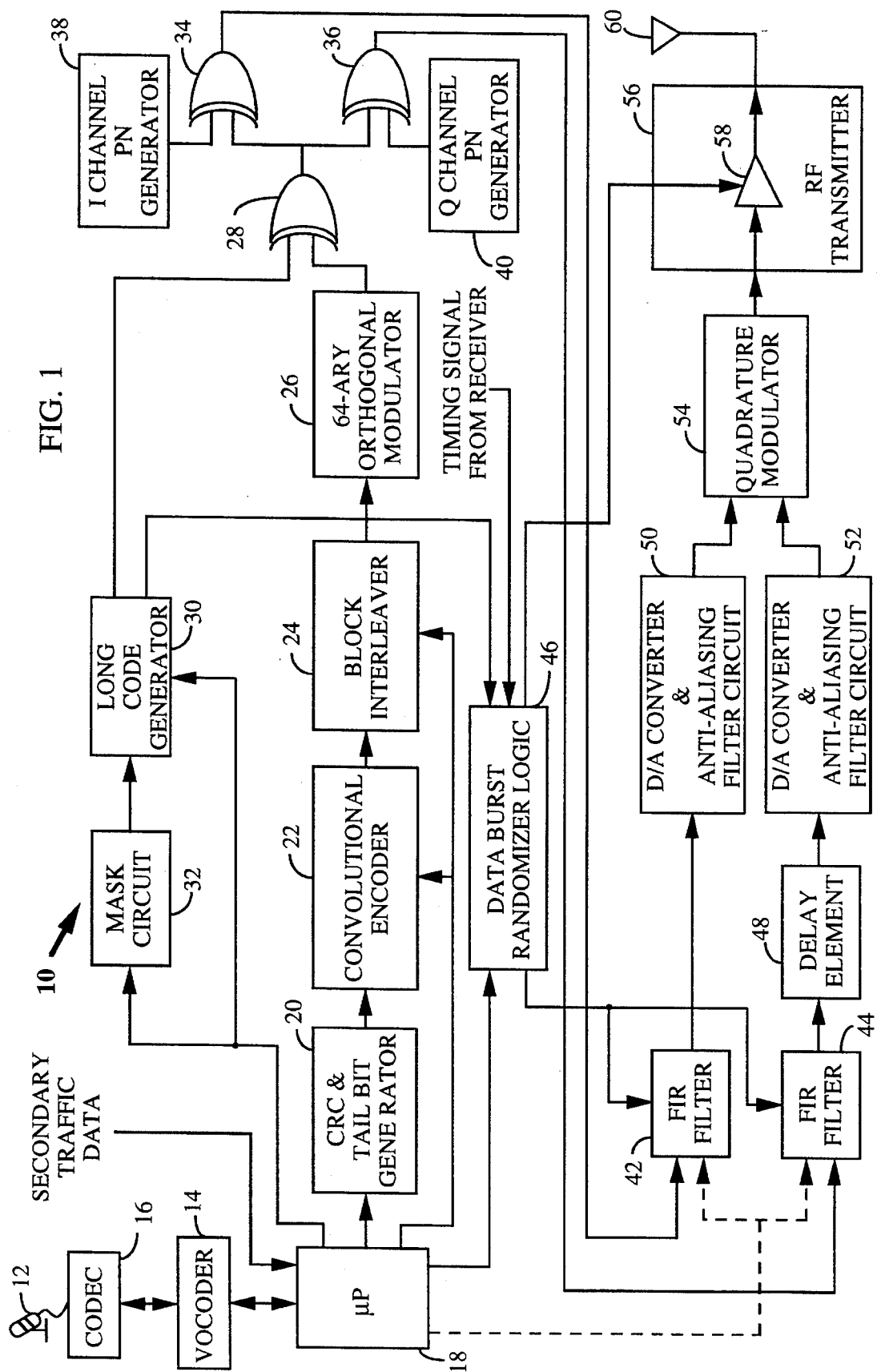
FIG. 1 is a block diagram illustrating an exemplary embodiment for a transmitter portion of a transceiver.

Referring now to the drawings, FIG. 1 illustrates an exemplary embodiment of a transmit portion 10 of a CDMA mobile station transceiver or PCN handset. In a CDMA cellular communication system a forward CDMA channel is used to transmit information from a cell base station to the mobile station. Conversely a reverse CDMA channel is used to transmit information from the mobile station to the cell base station. The communication of signals from the mobile station may be characterized in the form of an access channel or a traffic channel communication. The access channel is used for short signaling messages such as call originations, responses to pages, and registrations. The traffic channel is used to communicate (1) primary traffic, typically includes user speech, or (2) secondary traffic, typically user data, or (3) signaling traffic, such as command and control signals, or (4) a combination of primary traffic and secondary traffic or (5) a combination of primary traffic and signaling traffic.

Transmit portion 10 enables data to be transmitted on the reverse CDMA channel at data rates of 9.6 kbps, 4.8 kbps, 2.4 kbps or 1.2 kbps. Transmissions on the reverse traffic channel may be at any of these data rates while transmissions on the access channel are at the 4.8 kbps data rate. The transmission duty cycle on the reverse traffic channel will vary with the transmission data rate. Specifically, the transmission duty cycle for each rate is provided in Table I. As the duty cycle for transmission varies proportionately with the data rate, the actual burst transmission rate is fixed at 28,800 code symbols per second. Since six code symbols are modulated as one of 64 Walsh symbols for transmission, the Walsh symbol transmission rate shall be fixed at 4800 Walsh symbols per second which results in a fixed Walsh chip rate of 307.2 kcps.

All data that is transmitted on the reverse CDMA channel is convolutional encoded, block interleaved, modulated by 64-ary modulation, and direct-sequence PN spread prior to transmission. Table I further defines the relationships and rates for data and symbols for the various transmission rates on the reverse traffic channel. The numerology is identical for the access channel except that the transmission rate is fixed at 4.8 kbps, and the duty cycle is 100%. As described later herein each bit transmitted on the reverse CDMA channel is convolutional encoded using a rate ⅓ code. Therefore, the code symbol rate is always three times the data rate. The rate of the direct-sequence spreading functions shall be fixed at 1.2288 MHz, so that each Walsh chip is spread by precisely four PN chips.

In the variable rate vocoder just mentioned, the speech analysis frames are 20 msec. in length, implying that the extracted parameters are output to microprocessor 18 in a burst 50 times per second. Furthermore the rate of data output is varied from roughly 8 kbps to 4 kbps to 2 kbps, and to 1 kbps.

TABLE I

| Bit Rate (kbps) | 9.6 | 4.8 | 2.4 | 1.2 |
| --- | --- | --- | --- | --- |
| PN Chip Rate (Mcps) | 1.2288 | 1.2288 | 1.2288 | 1.2288 |
| Code Rate (bits/code symbol) | 1/3 | 1/3 | 1/3 | 1/3 |
| TX Duty Cycle (%) | 100.0 | 50.0 | 25.0 | 12.5 |
| Code Symbol Rate (sps) | 28,800 | 28,800 | 28,800 | 28,800 |
| Modulation (code symbol/Walsh symbol) | 6 | 6 | 6 | 6 |
| Walsh Symbol Rate (sps) | 4800 | 4800 | 4800 | 4800 |
| Walsh Chip; Rate (kcps) | 307.20 | 307.20 | 307.20 | 307.20 |
| Walsh Symbol (μs) | 208.33 | 208.33 | 208.33 | 208.33 |
| PN Chips/Code Symbol | 42.67 | 42.67 | 42.67 | 42.67 |
| PN Chips/Walsh Symbol | 256 | 256 | 256 | 256 |
| PN Chips/Walsh Chip | 4 | 4 | 4 | 4 |

Transmit portion 10, when functioning in mode in which primary traffic is present, communicates acoustical signals, such as speech and/or background noise, as digital signals over the transmission medium. To facilitate the digital communication of acoustical signals, these signals are sampled and digitized by well known techniques. For example, in FIG. 1, sound is converted by microphone 12 to an analog signal which is then converted to a digital signal by codec 14. Codec 14 typically performs an analog to digital conversion process using a standard 8 bit/μlaw format. In the alternative, the analog signal may be directly converted to digital form in a uniform pulse code modulation (PCM) format. In an exemplary embodiment codec 14 uses an 8 kHz sampling and provides an output of 8 bit samples at the sampling rate so as to realize a 64 kbps data rate.

The 8-bit samples are output from codec 14 to vocoder 16 where a μlaw/uniform code conversion process is performed. In vocoder 16, the samples are organized into frames of input data wherein each frame is comprised of a predetermined number of samples. In a preferred implementation of vocoder 16 each frame is comprised of 160 samples or of 20 msec. of speech at the 8 kHz sampling rate. It should be understood that other sampling rates and frame sizes may be used. Each frame of speech samples is variable rate encoded by vocoder 16 with the resultant parameter data formatted into a corresponding data packet. The vocoder data packets are then output to microprocessor 18 and associated circuitry for transmission formatting. Microprocessor 18 generically includes program instructions contained with a program instruction memory, a data memory, and appropriate interface and related circuitry as is known in the art.

A preferred implementation of vocoder 16 utilizes a form of the Code Excited Linear Predictive (CELP) coding techniques so as to provide a variable rate in coded speech data. A Linear Predictive Coder (LPC) analysis is performed upon a constant number of samples, and the pitch and codebook searches are performed on varying numbers of samples depending upon the transmission rate. A variable rate vocoder of this type is described in further detail in copending U.S. patent application Ser. No. 07/713,661 filed Jun. 11, 1991, and assigned to the Assignee of the present invention. Vocoder 16 may be implemented in an application specific integrated circuit (ASIC) or in a digital signal processor.

At full rate, also referred to as rate 1, data transmission between the vocoder and the microprocessor is at an 8.55 kbps rate. For the full rate data the parameters are encoded for each frame and represented by 160 bits. The full rate data frame also includes a parity check of 11 bits thus resulting in a full rate frame being comprised of a total of 171 bits. In the full rate data frame, the transmission rate between the vocoder and the microprocessor absent the parity check bits would be 8 kbps.

At half rate, also referred to as rate ½, data transmission between the vocoder and the microprocessor is at a 4 kbps rate with the parameters encoded for each frame using 80 bits. At quarter rate, also referred to as rate ¼, data transmission between the vocoder and the microprocessor is at a 2 kbps rate with the parameters encoded for each frame using 40 bits. At eighth rate, also referred to as rate ⅛, data transmission between the vocoder and the microprocessor is slightly less than a 1 kbps rate with the parameters encoded for each frame using 16 bits.

In addition, no information may be sent in a frame between the vocoder and the microprocessor. This frame type, referred to as a blank frame, may be used for signaling or other non-vocoder data.

The vocoder data packets are then output to microprocessor 18 and CRC and Tail Bit generator 20 for completing the transmission formatting. Microprocessor 18 receives packets of parameter data every 20 msec. along with a rate indication for the rate the frame of speech samples was encoded. Microprocessor 18 also receives, if present, an input of secondary traffic data for output to generator 20. Microprocessor 18 also internally generates signaling data for output to generator 20. Data whether it is primary traffic, secondary traffic or signaling traffic matter, if present, is output from microprocessor 18 to generator 20 every 20 msec. frame.

Generator 20 generates and appends at the end of all full and half rate frames a set of parity check bits or cyclic redundancy check bits (CRC Bits) which are used at the receiver as a frame quality indicator. For a full rate frame, regardless of whether the data is a full rate primary, secondary or signaling traffic, or a combination of half rate primary and secondary traffic, or a combination of half rate primary and signaling traffic, generator 20 preferably generates a set of CRC Bits according to a first polynomial. For a half rate data frame, generator 20 also generates a set of CRC Bits preferably according to a second polynomial. Generator 20 further generates for all frame rates a set of Encoder Tail Bits which follow the CRC bits, if present, or data if CRC bits are not present, at the end of the frame. Further details of the operation on microprocessor 18 and generator 20 are provided later herein with reference to FIGS. 3 and 4.

Reverse traffic channel flames provided from generator 20 at the 9.6 kbps rate are 192 bits in length and span the 20 msec. frame. These frames consist of a single Mixed Mode Bit, auxiliary format bits if present, message bits, a 12-bit frame quality indicator (CRC), and 8 Encoder Tail Bits as shown in FIGS. 2a–2e. The Mixed Mode Bit shall be set to '0' during any frame in which the message bits are primary traffic information only. When the Mixed Mode Bit is '0', the frame shall consist of the Mixed Mode Bit, 171 Primary Traffic bits, 12 CRC Bits, and 8 Encoder Tail Bits.

The Mixed Mode Bit is set to '1' for frames containing secondary or signaling traffic. In these instances the first bit following the Mixed Mode Bit is a Burst Format Bit which specifies whether the frame is in a "blank-and-burst" or a "dim-and-burst" format. A "blank-and-burst" operation is one in which the entire frame is used for secondary or signaling traffic while a "dim-and-burst" operation is one in which the primary traffic shares the frame with either secondary or signaling traffic. If the Burst Format Bit is a '0', the frame is of the "dim and burst format", and if a '1' the frame is of the "blank and burst format".

Figure 2A:
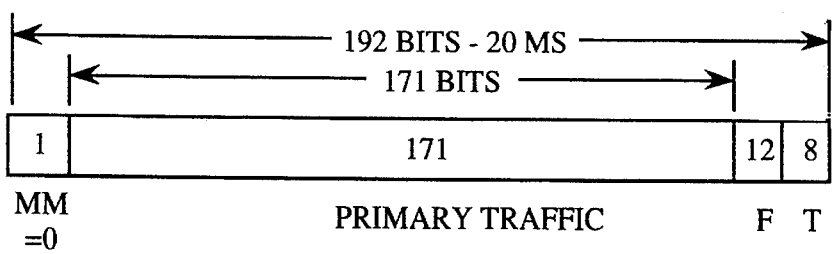
FIGS. 2a–2h are a series of diagrams illustrating frame data formats for the various data rates, types and modes.
Figure 2B:
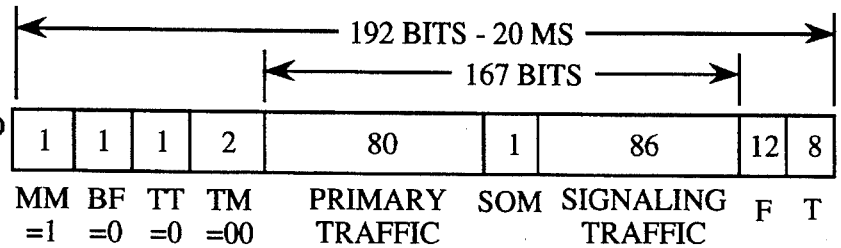

The second bit following the Mixed Mode Bit is a Traffic Type Bit. The Traffic Type Bit is used to specify whether the frame contains secondary or signaling traffic. If the Traffic Type Bit is a '0', the frame contains signaling traffic, and if a '1', the frame contains secondary traffic. FIGS. 2b–through 2e illustrate the Burst Format Bit and the Traffic Type Bit.

Figure 2C:
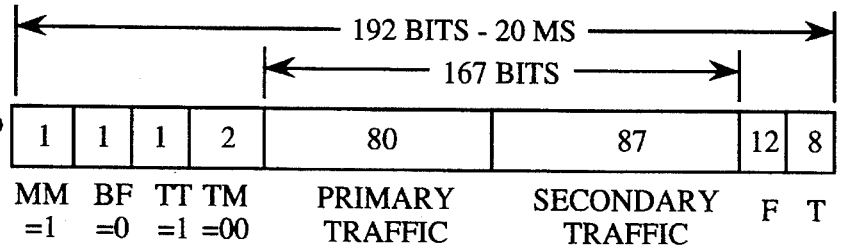

When the Burst Format Bit is '0' denoting dim-and-burst, the two bits following the Traffic Type Bit are Traffic Mode Bits. These bits indicate the number of bits that are used for primary traffic information and the number of bits that shall be used for either signaling or secondary traffic information within that frame. For a default mode, only the Traffic Mode '00' is defined with all other traffic modes reserved for other bit type and numbers. Referring to FIGS. 2b and 2c, in the exemplary and preferred embodiment, 80 bits are used for primary traffic (half rate vocoder data packet) while 86 and 87 bits are respectively used for signaling and secondary traffic.

In frames where there is signaling traffic present the first bit of the frame's signaling portion is a Start of Message (SOM) Bit. The SOM Bit is a '1' if a reverse traffic channel message (signaling message) begins at the following bit. Generally the first bit of a reverse traffic channel message does not begin anywhere else in the frame other than following the SOM Bit. However should the frame contained part of a message that began in a previous frame the SOM Bit is a '0'. If the SOM Bit is a '0' the following bit is part of the message but it is not the first bit of the complete message.

In the preferred implementation only primary traffic is transmitted in frames at the 4.8 kbps, 2.4 kbps, and 1.2 kbps rates. Mixed mode operation is generally not be supported at rates other than the 9.6 kbps rate, although it may be readily configured to do so. The frame formats for these particular rates are shown in FIGS. 2f–2h. For the 4.8 kbps rate, the frame is 96 bits in length with the bits spaced over the 20 msec. time period of the frame as described later herein. The 4.8 kbps rate frame contains 80 primary traffic bits, an 8-bit frame quality indicator (CRC), and 8 Encoder Tail Bits. For the 2.4 kbps rate, the frame is 48 bits in length with the bits spaced over the 20 msec. time period of the frame as also described later herein. The 2.4 kbps rate frame contains 40 primary traffic bits and 8 Encoder Tail Bits. For the 1.2 kbps rate, the frame is 24 bits in length with the bits spaced over the 20 msec. time period of the frame as also described later herein. The 1.2 kbps rate frame contains 16 primary traffic bits and 8 encoder tail bits.

In a preferred embodiment the access channel data is generated by microprocessor 18 for transmission at a rate of 4.8 kbps. As such the data is prepared in a manner identical to that of 4.8 kbps frame format data, such as encoding, interleaving as Walsh encoding. In the encoding scheme implemented for the 4.8 kbps data, whether reverse traffic channel data or access channel data, redundant data is generated. Unlike the reverse traffic channel where the redundant data is eliminated in the transmission, in access channel all data including redundant data is transmitted. Details on the transmission aspects of frames of access channel data are provided later herein.

FIG. 3 illustrates an exemplary implementation of the elements for formatting the data in accordance with FIGS. 2a–2h. In FIG. 3 data is transmitted from microprocessor 18 (FIG. 1) to generator 20. Generator 20 is comprised of data buffer and control logic 60, CRC circuits 62 and 64, and Tail Bit circuit 66. Along with data provided from the microprocessor a rate command may optionally be provided. Data is transferred for each 20 msec frame from the microprocessor to logic 60 where temporarily stored. For each frame, logic 60 may for each frame count the number of bits transmitted from the microprocessor, or in the alternative use the rate command and a count of the clock cycles in formatting a frame of data.

Each frame of the traffic channel includes a frame quality indicator. For the 9.6 kbps and 4.8 kbps transmission rates, the frame quality indicator is the CRC. For the 2.4 kbps and 1.2 kbps transmission rates, the frame quality indicator is implied, in that no extra frame quality bits are transmitted. The frame quality indicator supports two functions at the receiver. The first function is to determine the transmission rate of the frame, while the second function is to determine whether the frame is in error. At the receiver these determinations are made by a combination of the decoder information and the CRC checks.

For the 9.6 kbps and 4.8 kbps rates, the frame quality indicator (CRC) is calculated on all bits within the frame, except the frame quality indicator (CRC) itself and the Encoder Tail Bits. Logic 60 provides the 9.6 kbps and 4.8 kbps rate data respectively to CRC circuits 62 and 64. Circuits 62 and 64 are typically constructed as a sequence of shift registers, modulo-2 adders (typically exclusive-OR gates) and switches as illustrated.

The 9.6 kbps transmission rate data uses a 12-bit frame quality indicator (CRC), which is be transmitted within the 192-bit long frame as discussed with reference to FIGS. 2a–2e. As illustrated in FIG. 3 for CRC circuit 62, the generator polynomial for the 9.6 kbps rate is as follows:

$$g(x) = x^{12} + x^{11} + x^{10} + x^9 + x^8 + x^4 + x + 1. \tag{1}$$

The 4.8 kbps transmission rate data uses an 8-bit CRC, which is transmitted within the 96-bit long frame as discussed with reference to FIG. 2f. As illustrated in FIG. 3 for CRC circuit 64, the generator polynomial for the 4.8 kbps rate is as follows:

$$g(x)=x^8+x^7+x^4+x^3+x+1. \tag{2}$$

Initially, all shift register elements of circuits 62 and 64 are set to logical one ('1') by an initialization signal from logic 60. Furthermore logic 60 set the switches of circuits 62 and 64 in the up position.

For 9.6 kbps rate data, the registers of circuit 62 are then clocked 172 times for the 172 bits in the sequence of primary traffic, secondary traffic or signaling bits or a mixture thereof along with the corresponding mode/format indicator bits as input to circuit 62. After 172 bits are clocked through circuit 62, logic 60 then sets the switches of circuit 62 in the down position with the registers of circuit 62 then being clocked an additional 12 times. As a result of the 12 additional clockings of circuit 62, 12 additional output bits are generated which are the CRC bits. The CRC bits, in the order calculated, are appended to the end of the 172 bits as output from circuit 62. It should be noted that the 172 bits output from logic 60 which pass through circuit 62 are undisturbed by the computation of the CRC bits and are thus output from circuit 62 in the same order and at the same value at which they entered.

For 9.6 kbps rate data bits are input to circuit 64 from logic 60 in the following order. For the case of primary traffic only, the bits are input to circuit 64 from logic 60 in the order of the single mixed mode (MM) bit followed by the 171 primary traffic bits. For the case of "dim and burst" with primary and signaling traffic, the bits are input to circuit 64 from logic 60 in the order of the single MM bit, a single burst format (BF) bit, a traffic type (TT) bit, a pair of traffic mode (TM) bits, 80 primary traffic bits, a start of message (SOM) bit, and 86 signaling traffic bits. For the case of "dim and burst" with primary and secondary traffic, the bits are input to circuit 64 from logic 60 in the order of the single MM bit, the single BF bit, the TT bit, the pair of TM bits, 80 primary traffic bits and 87 signaling traffic bits. For the case of "blank and burst" data format with signaling traffic only, the bits are input to circuit 64 from logic 60 in the order of the single MM bit, the single BF bit, the TT bit, the SOM bit and 168 signaling traffic bits. For the case of "blank and burst" data format with secondary traffic only, the bits are input to circuit 64 from logic 60 in the order of the single MM bit, the single BF bit, the TT bit and 169 signaling traffic bits.

Similarly for 4.8 kbps rate data, the registers of circuit 64 are clocked 80 times for the 80 bits of primary traffic data, or for the 80 bits of access channel data, as input to circuit 64 from logic 60. After the 80 bits are clocked through circuit 64, logic 60 then sets the switches of circuit 64 in the down position with the registers of circuit 64 then being clocked an additional 8 times. As a result of the 12 additional clockings of circuit 62, 12 additional output bits are generated which are the CRC bits. The CRC bits, in the order calculated, are again appended to the end of the 80 bits as output from circuit 64. It should again be noted that the 80 bits output from logic 60 which pass through circuit 64 are undisturbed by the computation of the CRC bits and are thus output from circuit 64 in the same order and at the same value at which they entered.

The bits output from either of circuits 62 and 64 are provided to switch 66 which is under the control of logic 60. Also input to switch 66 are the 40 and 16 bits of primary traffic data output from logic 60 for 2.4 kbps and 1.2 kbps data frames. Switch 66 selects between providing an output of the input data (up position) and tail bits at a logical zero ('0') value (down position). Switch 66 is normally set in the up position to permit data from logic 60, and from circuits 62 and 64 if present, to be output from generator 20 to encoder 22 (FIG. 1). For the 9.6 kbps and 4.8 kbps frame data, after the CRC bits are clocked through switch 66, logic 60 sets the switch to the down position for 8 clock cycles so as to generate 8 all zero tail bits. Thus for 9.6 kbps and 4.8 kbps data frames, the data as output to the encoder for the frame includes appended after the CRC bits, the 8 tail bits. Similarly for the 2.4 kbps and 1.2 kbps frame data, after the primary traffic bits are clocked from logic 60 through switch 66, logic 60 sets the switch to the down position for 8 clock cycles so as to again generate 8 all zero tail bits. Thus for 2.4 kbps and 1.2 kbps data frames, the data as output to the encoder for the frame includes appended after the primary traffic bits, the 8 tail bits.

FIGS. 4a–4e illustrate in a series of flow charts the operation of microprocessor 18, and generator 20 in assembling the data into the disclosed frame format. It should be noted that various schemes may be implemented for giving the various traffic types and rates priority for transmission. In an exemplary implementation, when a signaling traffic message is to be sent when there is vocoder data present a "dim and burst" format may be selected. Microprocessor 18 may generate a command to vocoder 18 for the vocoder to encode speech sample frames at the half rate, regardless of the rate at which the vocoder would normally encode the sample frame. Microprocessor 18 then assembles the half rate vocoder data with the signaling traffic into the 9.6 kbps frame as illustrated in FIG. 2b. In this case, a limit may be place on the number of speech frames encoded at the half rate to avoid degradation in the speech quality. In the alternative, microprocessor 18 may wait until a half rate frame of vocoder data is received before assembling the data into the "dim and burst" format. In this case, in order to ensure timely transmission of the signaling data, a maximum limit on the number of consecutive frames at other than half rate may be imposed before a command is sent to the vocoder to encode at half rate. Secondary traffic may be transferred in the "dim and burst" format (FIG. 2c) in a similar manner.

Figure 2D:
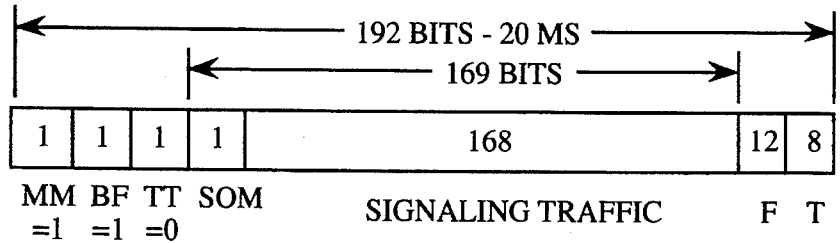
Figure 2E:
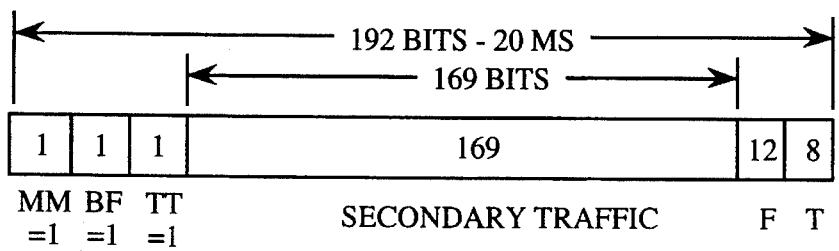
Figure 2F:
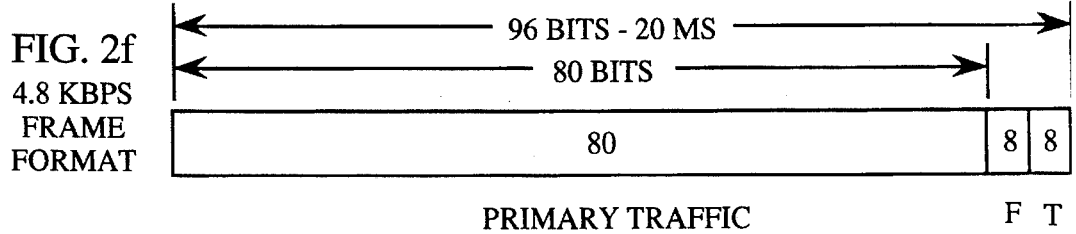
Figure 2G:
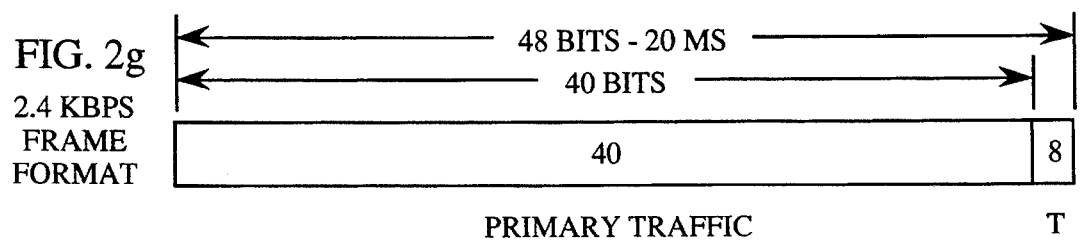
Figure 2H:
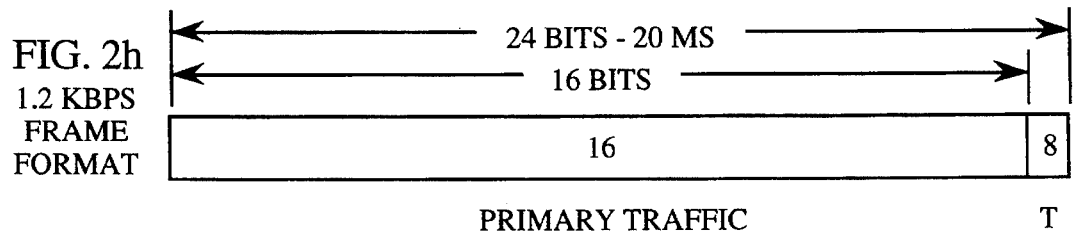
Figure 4A:
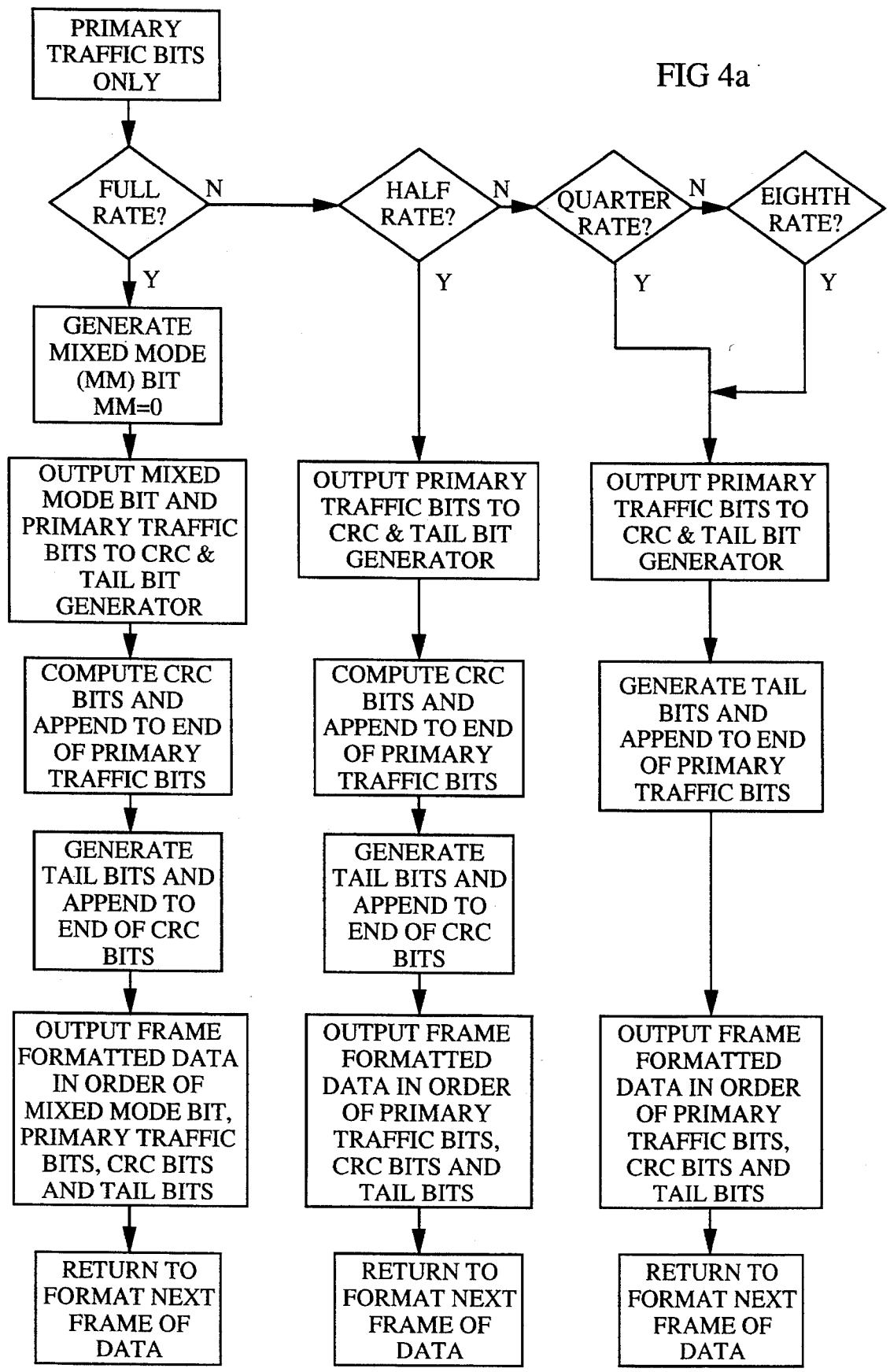
FIGS. 4a–4e is a flow chart of the formatting of frames of data.
Figure 4B:
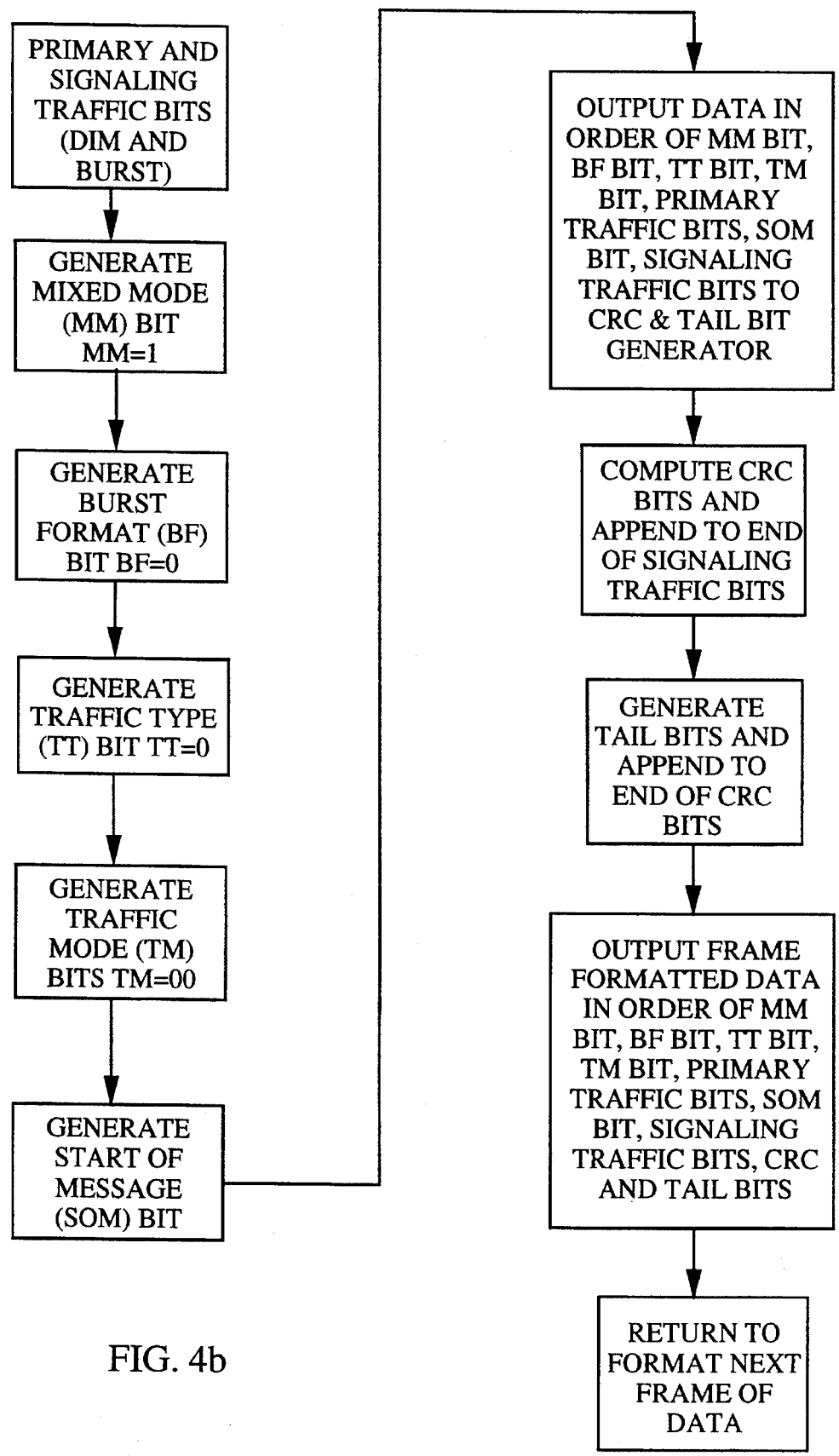
Figure 4C:
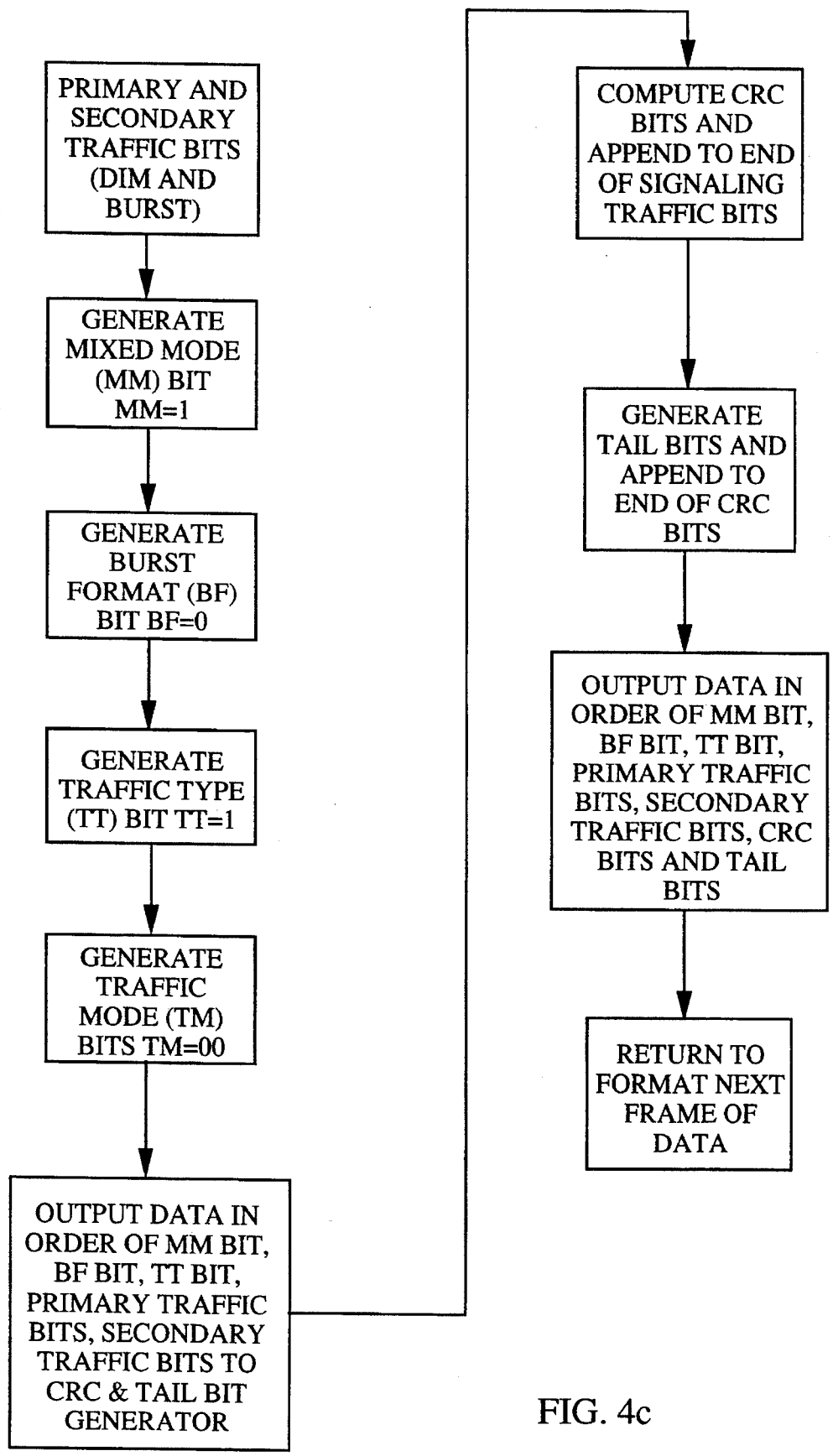
Figure 4D:
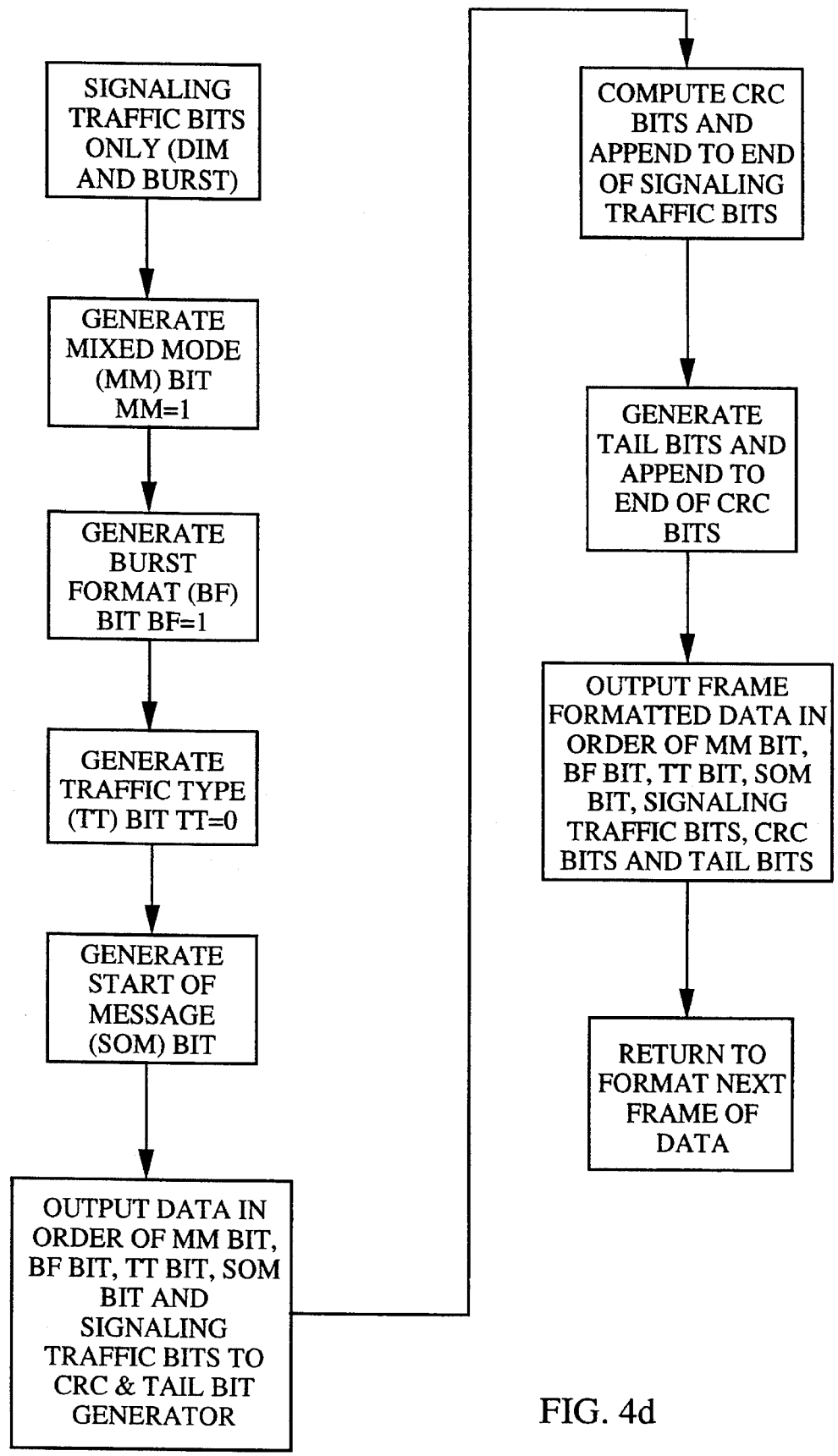
Figure 4E:
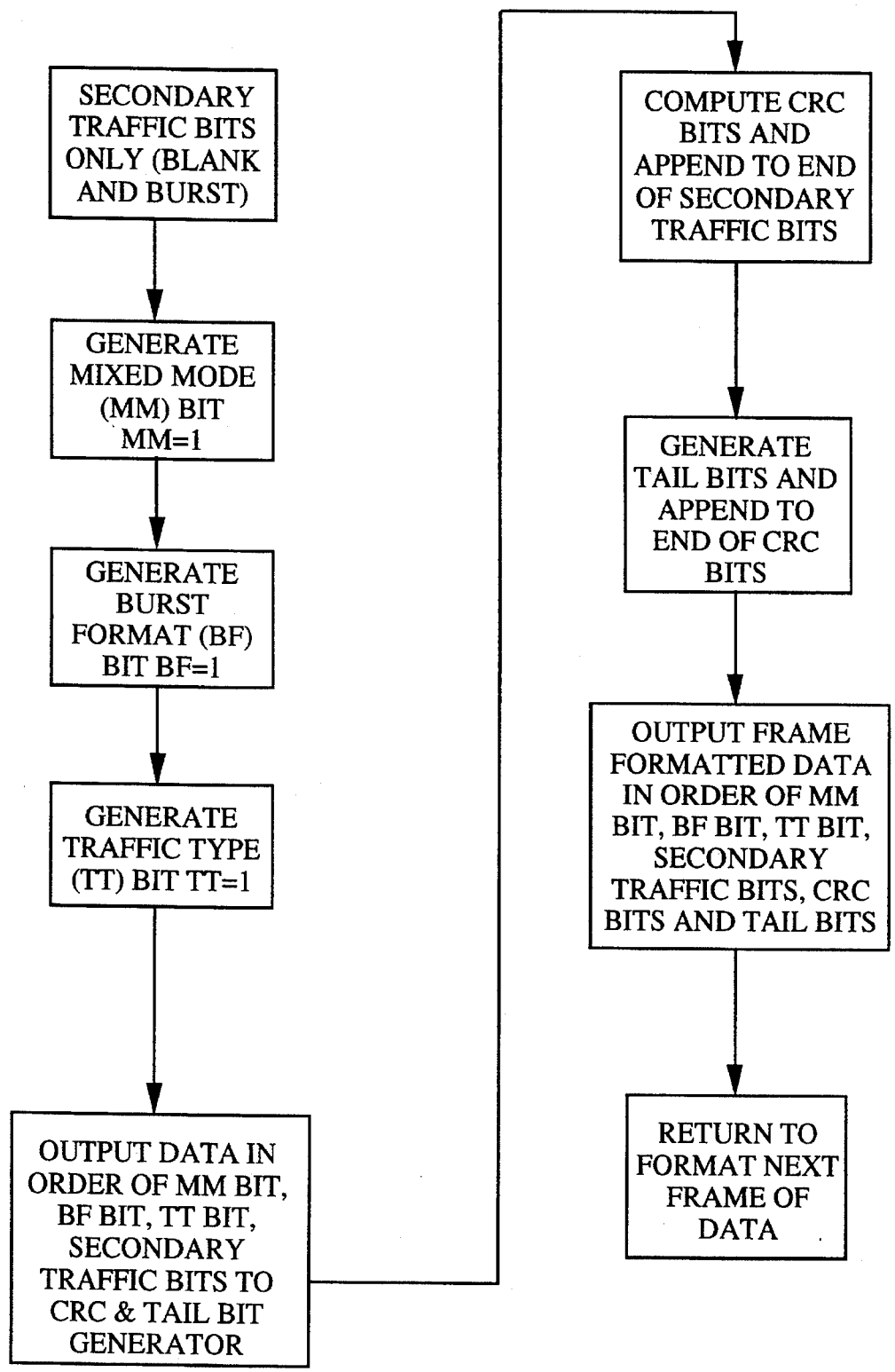

Similar is the case for the "blank and burst" data formats as illustrated in FIGS. 2d–2d. The vocoder may be commanded to not encode the frame of speech samples or the vocoder data is ignored by the microprocessor in constructing the data frame. Prioritizing between generating frame formats of primary traffic of various rate, "dim and burst" traffic, and "blank and burst" traffic is open to many possibilities.

Referring back to FIG. 1, 20 msec. frames of 9.6 kbps, 4.8 kbps, 2.4 kbps and 1.2 kbps data are thus output from generator 20 to encoder 22. In the exemplary embodiment encoder 22 is a preferably a convolutional encoder, a type of encoder well known in the art. Encoder 22 preferably encodes the data using a rate ⅓, constraint length k=9 convolutional code. As an example encoder 22 is constructed with generator functions of $g_0$=557(octal), $g_1$=663(octal) and $g_2$=711(octal). As is well known in the art, convolutional encoding involves the modulo-2 addition of selected taps of a serially time-shifted delayed data sequence. The length of the data sequence delay is equal to k−1, where k is the code constraint length. Since in the preferred embodiment a rate ⅓ code is used, three code symbols, the code symbols ($c_0$), ($c_1$) and ($c_2$), are generated for each data bit input to the encoder. The code symbols ($c_0$), ($c_1$) and ($c_2$) are respectively generated by the generator functions $g_0$, $g_1$ and $g_2$. The code symbols are output from encoder 22 to block interleaver 24. The output code code symbols are provided to interleaver 24 in the order of the code symbol ($c_0$) being first, the code symbol ($c_1$) being second and the code symbol ($c_2$) being last. The state of the encoder 22, upon initialization, is the all-zero state. Furthermore the use of tail bits at the end of each frame provides a resetting of encoder 22 to an all-zero state.

The symbols output from encoder 22 are provided to block interleaver 24 which under the control of microprocessor 18 provides a code symbol repetition. Using a conventional random access memory (RAM) with the symbols stored therein as addressed by microprocessor 18, code symbols may be stored in a mariner to achieve a code symbol repetition rate that varies with the data channel.

Code symbols are not be repeated for the 9.6 kbps data rate. Each code symbol at the 4.8 kbps data rate is repeated 1 time, i.e. each symbol occurs 2 times. Each code symbol at the 2.4 kbps data rate is repeated 3 times, i.e. each symbol occurs 4 times. Each code symbol at the 1.2 kbps data rate is repeated 7 times, i.e. each symbol occurs 8 times. For all data rates (9.6, 4.8, 2.4 and 1.2 kbps), the code repetition results in a constant code symbol rate of 28,800 code symbols per second for the data as output from interleaver 24. On the reverse traffic channel the repeated code symbols are not transmitted multiple times with all but one of the code symbol repetitions deleted prior to actual transmission due to the variable transmission duty cycle as discussed in further detail below. It should be understood that the use of code symbol repetition as an expedient method for describing the operation of the interleaver and a data burst randomizer as discussed again in further detail below. It should be further understood that implementations other than those that use code symbol repetition may be readily devised that achieve the same result and remain within the teaching of the present invention.

All code symbols to be transmitted on the reverse traffic channel and the access channel are interleaved prior to modulation and transmission. Block interleaver 24, constructed as is well known in the art, provides an output of the code symbols over a time period spanning 20 msec. The interleaver structure is typically a rectangular array with 32 rows and 18 columns, i.e. 576 cells. Code symbols are written into the interleaver by columns, with repetition for data at the 9.6, 4.8, 2.4 and 1.2 kbps rate, so as to completely fill the 32×18 matrix. FIGS. 5a–5d illustrate the ordering of write operations of repeated code symbols into the interleaver array for transmission data rates of 9.6, 4.8, 2.4 and 1.2 kbps, respectively.

Reverse traffic channel code symbols are output from the interleaver by rows. Microprocessor 18 also controls the addressing of the interleaver memory for outputting the symbols in the appropriate order. The interleaver rows are preferably output in the following order:

At 9.6 kbps:

1 2 3 4 5 6 7 8 9 10 11 12 13 14 15 16 17 18 19 20 21 22 23 24 25 26 27 28 29 30 31 32

At 4.8 kbps:

1 3 2 4 5 7 6 8 9 11 10 12 13 15 14 16 17 19 18 20 21 23 22 24 25 27 26 28 29 31 30 32

At 2.4 kbps:

1 5 2 6 3 7 4 8 9 13 10 14 11 15 12 16 17 21 18 22 19 23 20 24 25 29 26 30 27 31 28 32

At 1.2 kbps:

1 9 2 10 3 11 4 12 5 13 6 14 7 15 8 16 17 25 18 26 19 27 20 28 21 29 22 30 23 31 24 32.

Access channel code symbols are also output from interleaver 24 by rows. Microprocessor 18 again controls the addressing of the interleaver memory for outputting the symbols in the appropriate order. The interleaver rows are output in the following order at the 4.8 kbps rate for the access channel code symbols:

1 17 9 25 5 21 13 29 3 19 11 27 7 23 15 31 2 18 10 26 6 22 14 30 4 20 12 28 8 24 16 32.

It should be noted that other encoding rates, such as a rate ½ convolutional code used on the forward transmission channel, along with various other symbol interleaving formats may be readily devised using the basic teaching of the present invention.

Referring again to FIG. 1, the interleaved code symbols are output from interleaver 24 to modulator 26. In the preferred embodiment modulation for the Reverse CDMA Channel uses 64-ary orthogonal signaling. That is, one of 64 possible modulation symbols is transmitted for each six code symbols. The 64-ary modulation symbol is one of 64 orthogonal waveforms generated preferably using Walsh functions. These modulation symbols are given in FIGS. 6a–6c and are numbered 0 through 63. The modulation symbols are selected according to the following formula:

$$\text{Modulation symbol number} = c_0 + 2c_1 + 4c_2 + 8c_3 + 16c_4 + 32c_5 \quad (3)$$

where $c_5$ shall represent the last or most recent and $c_0$ the first or oldest binary valued ('0' and '1') code symbol of each group of six code symbols that form a modulation symbol. The period of time required to transmit a single modulation symbol is referred to as a "Walsh symbol" interval and is approximately equal to 208.333 µs. The period of time associated with one-sixty-fourth of the modulation symbol is referred to as a "Walsh chip" and is approximately equal to 3.2552083333 . . . µs.

Each modulation or Walsh symbol is output from modulator 26 to one input of a modulo-2 adder, exclusive-OR gate 28. The Walsh symbols are output from modulator at a 4800 sps rate which corresponds to a Walsh chip rate of 307.2 kcps. The other input to gate 28 is provided from long code generator 30 which generates a masked pseudonoise (PN) code, referred to as the long code sequence, in cooperation with mask circuit 32. The long code sequence provided from generator 30 is at a chip rate rate four times the Walsh chip rate of modulator 26, i.e. a PN chip rate 1.2288 Mcps. Gate 28 combines the two input signals to provide an output of data at the chip rate of 1.2288 Mcps.

The long code sequence is a time shift of a sequence of length $2^{42}-1$ chips and is generated by a linear generator well known in the art using the following polynomial:

$$p(x) = x^{42} + x^{35} + x^{33} + x^{31} + x^{27} + x^{26} + x^{25} + x^{22} + x^{21} + x^{19} + x^{18} + x^{17} + x^{16} + x^{10} + x^7 + x^6 + x^5 + x^3 + x^2 + x^1 + 1 \quad (4)$$

Figure 7:
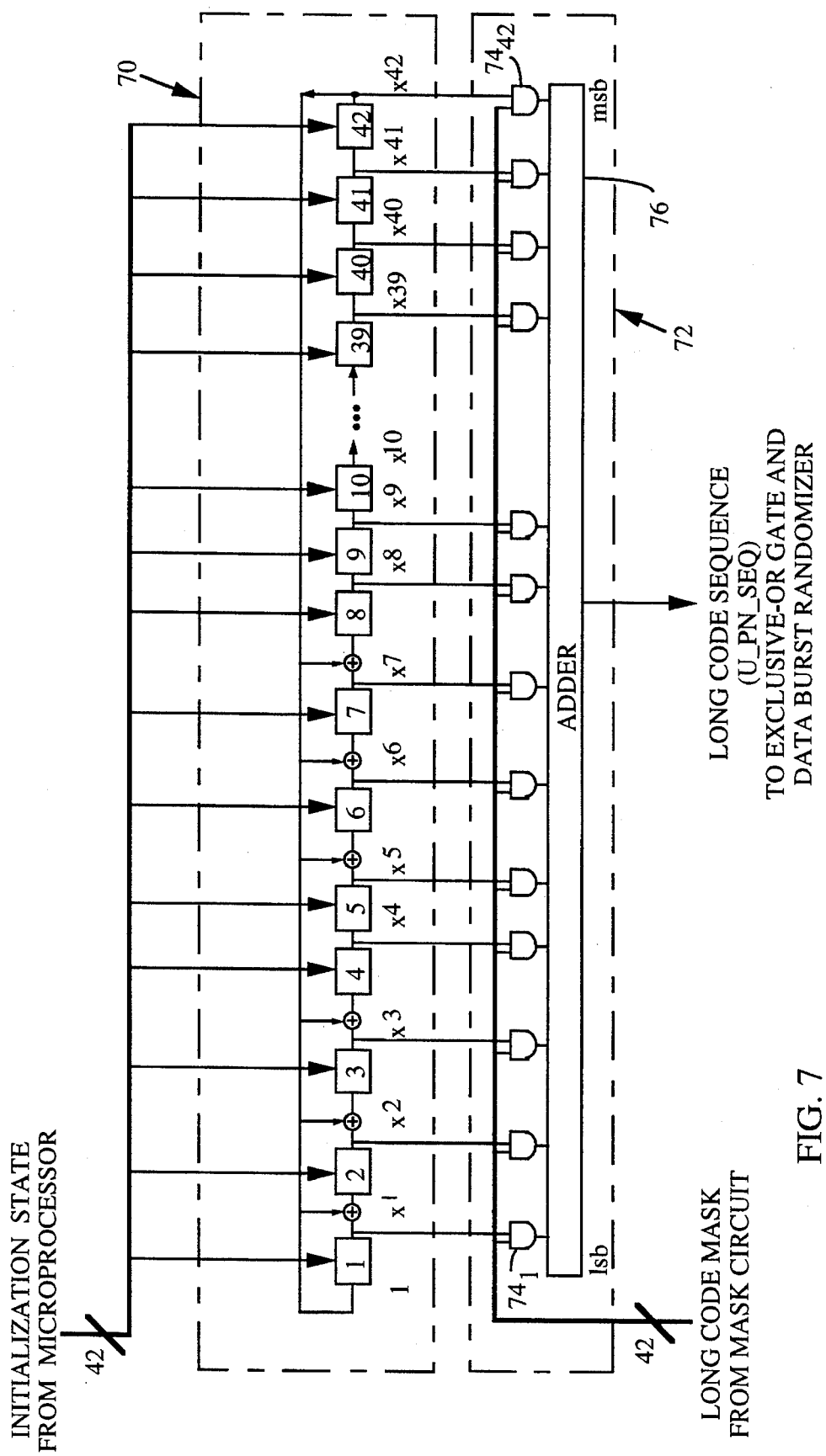
FIG. 7 is a block diagram illustrating the long code generator of FIG. 1.

FIG. 7 illustrates generator 30 in further detail. Generator 30 is comprised of a sequence generator section 70 and a masking section 72. Section 70 is comprised of a sequence of shift registers and modulo-2 adders (typically exclusive-OR gates) coupled together to generate a 42-bit code according to equation 4. The long code is then generated by masking the 42-bit state variables output from section 70 with a 42-bit wide mask provided from mask circuit 32.

Section 72 is comprised of a series of input AND gates $74_1$–$74_{42}$ having one input for receiving a respective mask bit of the 42-bit wide mask. The other input of each of AND gates $74_1$–$74_{42}$ receives the output from a corresponding shift register in section 70. The output of AND gates $74_1$–$74_{42}$ are modulo-2 added by adder 76 to form a single bit output for each 1.2288 MHz clocking of the shift registers of section 70. Adder 76 is typically constructed as a cascaded arrangement of exclusive-OR gates as is well known in the art. Therefore, the actual output PN sequence is generated by the modulo-2 addition of all 42 masked output bits of sequence generator 70 as shown in FIG. 7.

Figure 8A:
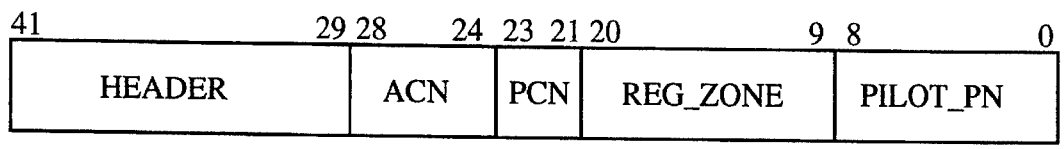
FIGS. 8a–8c are a series of diagrams illustrating long code masks for the various channel type.
Figure 8B:
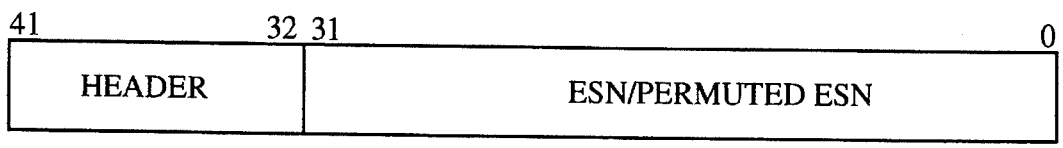
Figure 8C:
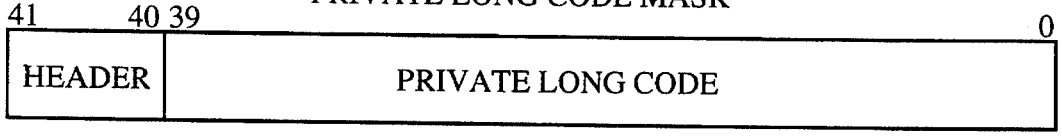

The mask used for the PN spreading shall vary depending on the channel type on which the mobile station is communicating. Referring to FIG. 1, an intialization information is provided from microprocessor 18 to generator 30 and circuit 32. Generator 30 is responsive to the initialization information for initialization of the circuitry. Mask 32 is also responsive to the initialization information, which indicates the mask type to be provided, to output a 42-bit mask. As such, mask circuit 32 may be configured as a memory which contains a mask for each communication channel type. FIGS. 8a–8c provide an exemplary definition of the masking bits for each channel type.

Specifically, when communicating on the Access Channel, the mask is defined as illustrated in FIG. 8a. In the Access Channel mask, mask bits $M_{24}$ through $M_{41}$ are set to '1'; mask bits $M_{19}$ through $M_{23}$ are set to the chosen Access Channel number; mask bits $M_{16}$ through $M_{18}$ are set to the code channel for the associated Paging Channel, i.e, the range typically being 1 through 7; mask bits $M_9$ through $M_{15}$ are set to the registration zone; for the current base station; and mask bits $M_0$ through $M_8$ are set to the pilot PN value for the current CDMA Channel.

When communicating on the Reverse Traffic Channel, the mask is defined as illustrated in FIG. 8b. The mobile station uses one of two long codes unique to that mobile station: a public long code unique to the mobile station's electronic serial number (ESN); and a private long code unique for each mobile identification number (MIN) which is typically the telephone number of the mobile station. In the public long code the mask bits $M_{32}$ through $M_{41}$ are set to '0,' and the mask bits $M_0$ through $M_{31}$ are set to the mobile station ESN value.

It is further envisioned that a private long code may be implemented as illustrated in FIG. 8c. The private long code will provide additional security in that it will only be known to the base station and the mobile station. The private long code will not be transmitted in the clear over the transmission medium. In the private long code the mask bit $M_{40}$ through $M_{41}$ are set to '0' and '1' respectively; while mask bits $M_0$ through $M_{39}$ may be set to according to a predetermined assignment scheme.

Referring back to FIG. 1 the output of gate 28 is respectively provided as one input to each one of a pair of modulo-2 adders, exclusive-OR gates 34 and 36. The other input to each of gates 34 and 36 are second and third PN sequences are I and Q channel "short codes" respectively generated by I and Q Channel PN generators 38 and 40. The Reverse Access Channel and Reverse Traffic Channel is therefore OQPSK spread prior to actual transmission. This offset quadrature spreading on the Reverse Channel uses the same I and Q PN codes as the Forward Channel I and Q pilot PN codes. The I and Q PN codes generated by generators 38 and 40 are of length $2^{15}$ and are preferably the zero-time offset codes with respect to the Forward Channel. For purposes of further understanding, on the Forward Channel a pilot signal is generated for each base station. Each base station pilot channel signal is spread by the I and Q PN codes as just mentioned. Base station I and Q PN codes are offset from one another, by a shifting of the code sequence, so as to provide a distinction between base station transmission. The generating functions for the I and Q short PN codes shall be as follows:

$$P_I(x)=x^{15}+x^{13}+x^9+x^8+x^7+x^5+1 \quad (5)$$

and $$P_Q(x)=x^{15}+x^{12}+x^{11}+x^{10}+x^6+x^5+x^4+x^3+1. \quad (6)$$

Generators 38 and 40 may be constructed as is well known in the art so as to provide an output sequence in accordance with equations (5) and (6).

The I and Q waveforms are respectively output from gates 34 and 36 where respectively provided as inputs to finite impulse response (FIR) filters 42 and 44. FIR filters 42 and 44 are digital filters which bandlimit the resulting I and Q waveforms. These digital filters shape the I and Q waveforms such that the resulting spectrum is contained within a given spectral mask. The digital filters preferably have the impulse response shown in the following Table II:

TABLE II

| | | | | | |
|---|---|---|---|---|---|
| h(0) = | −0.02204953170628 | = h(46) | h(12) = | 0.03881898337058 | = h(34) |
| h(1) = | −0.01997721494122 | = h(45) | h(13) = | 0.10411392223653 | = h(33) |
| h(2) = | −0.00905191683798 | = h(44) | h(14) = | 0.11268193747141 | = h(32) |
| h(3) = | 0.02005789896688 | = h(43) | h(15) = | 0.04184165339577 | = h(31) |
| h(4) = | 0.05926358628876 | = h(42) | h(16) = | −0.08271278252498 | = h(30) |
| h(5) = | 0.09021366056377 | = h(41) | h(17) = | −0.18998156787345 | = h(29) |
| h(6) = | 0.09304356333555 | = h(40) | h(18) = | −0.19486048259840 | = h(28) |
| h(7) = | 0.05917668051274 | = h(39) | h(19) = | −0.04343248005925 | = h(27) |
| h(8) = | 0.00032251394639 | = h(38) | h(20) = | 0.25121616493295 | = h(26) |
| h(9) = | −0.05381152911745 | = h(37) | h(21) = | 0.60403450701992 | = h(25) |
| h(10) = | −0.07036222587323 | = h(36) | h(22) = | 0.89017616954958 | = h(24) |
| h(11) = | −0.03405975708422 | = h(35) | h(23) = | 1 | = h(23) |

Figure 9:
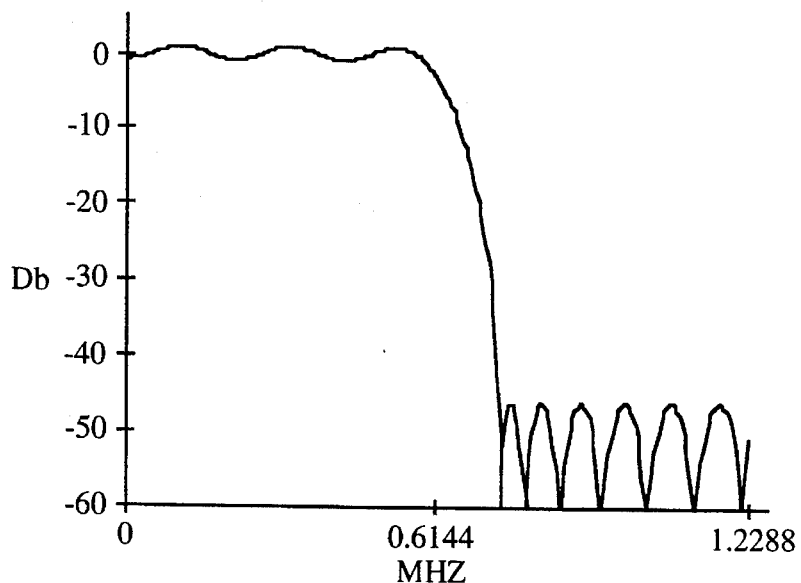
FIG. 9 is a graph illustrating the frequency response of the digital filters of FIG. 1.

Filters 42 and 44 may be constructed according to well known digital filter techniques and preferably provide a frequency response as illustrated in FIG. 9.

The binary '0' and '1' inputs to digital filters 42 and 44, generated by the PN spreading functions, are mapped into +1 and −1, respectively. The sampling frequency of the digital filter is 4.9152 MHz=4×1.2288 MHz. An additional binary '0' and '1' input sequence synchronous with the I and Q digital waveforms shall be provided to each of digital filters 42 and 44. This particular sequence, referred to as a masking sequence, is the output generated by a data burst randomizer. The masking sequence multiplies the I and Q binary waveforms to produce a ternary (−1, 0, and +1) input to the digital filters 42 and 44.

As discussed previously the data rate for transmission on the Reverse Traffic Channel is at one of the rates of equal 9.6, 4.8, 2.4, or 1.2 kbps and varies on a frame-by-frame basis. Since the frames are of a fixed 20 ms length for both the Access Channel and the Reverse Traffic Channel, the number of information bits per frame shall be 192, 96, 48, or 24 for transmission at data rates of 9.6, 4.8, 2.4, or 1.2 kbps, respectively. As described previously, the information is encoded using a rate ⅓ convolutional encoder and then the code symbols shall be repeated by a factor of 1, 2, 4, or 8 for a data rate of 9.6, 4.8, 2.4, or 1.2 kbps, respectively. The resulting repetition code symbol rate is thus fixed at 28,800 symbols per second (sps). This 28,800 sps stream is block interleaved as previously described.

Prior to transmission, the Reverse Traffic Channel interleaver output stream is gated with a time filter that allows transmission of certain interleaver output symbols and deletion of others. The duty cycle of the transmission gate thus varies with the transmit data rate. When the transmit data rate is 9.6 kbps, the transmission gate allows all interleaver output symbols to be transmitted. When the transmit data rate is 4.8 kbps, the transmission gate allows one-half of the interleaver output symbols to be transmitted, and so forth. The gating process operates by dividing the 20 msec frame into 16 equal length (i.e., 1.25 ms) periods, called power control groups. Certain power control groups are gated on (i.e., transmitted), while other groups are gated off (i.e., not transmitted).

The assignment of gated-on and gated-off groups is referred to as a data burst randomizer function. The gated-on power control groups are pseudo-randomized in their positions within the frame so that the actual traffic load on the Reverse CDMA Channel is averaged, assuming a random distribution of the frames for each duty cycle. The gated-on power control groups are such that every code symbol input to the repetition process shall be transmitted once without repetition. During the gated-off periods, the mobile station does not transmit energy, thus reducing the interference to other mobile stations operating on the same Reverse CDMA Channel. This symbol gating occurs prior to transmission filtering.

The transmission gating process is not used when the mobile station transmits on the Access Channel. When transmitting on the Access Channel, the code symbols are repeated once (each symbol occurs twice) prior to transmission.

In the implementation of the data burst randomizer function, data burst randomizer logic 46 generates a masking stream of 0's and 1's that randomly mask out the redundant data generated by the code repetition. The masking stream pattern is determined by the frame data rate and by a block of 14 bits taken from the long code sequence generated by generator 30. These mask bits are synchronized with the data flow and the data is selectively masked by these bits through the operation of the digital filters 42 and 44. Within logic 46 the 1.2288 MHz long code sequence output from generator 30 is input to a 14-bit shift register, which is shifted at a 1.2288 MHz rate. The contents of this shift register are loaded into a 14-bit latch exactly one power control group (1.25 ms) before each Reverse Traffic Channel frame boundary. Logic 46 uses this data along with the rate input from microprocessor 18, to determine, according to a predetermined algorithm, the particular power control group(s) in which the data is to be allowed to pass through filters 42 and 46 for transmission. Logic 46 thus outputs for each power control group a '1' or '0' for the entire power control group depending on whether the data is to be filtered out ('0') or passed through ('1'). At the corresponding receiver, which also uses the same long code sequence and a corresponding rate determined for the frame, determines the appropriate power control group(s) in which the data is present.

The I channel data output from filter 42 is provided directly to a digital to analog (D/A) converter and anti-aliasing filter circuit 50. The Q channel data however is output from filter 44 to a delay element 48 which a one-half PN chip time delay (406.9 nsec) in the Q channel data. The Q channel data is output from delay element 48 to digital to analog (D/A) converter and anti-aliasing filter circuit 52. Circuits 50 and 52 convert the digital data to analog form and filter the analog signal. The signals output from circuits 50 and 52 are provided to Offset Quadrature Phase Shift Key (OQPSK) modulator 54 where modulated and output to RF transmitter circuit 56. Circuit 56 amplifies, filters and frequency upconverts the signal for transmission. The signal is output from circuitry 56 to antenna 58 for communication to the base station.

It should be understood that the exemplary embodiment of the present invention discusses the formatting of data for modulation and transmission with respect to a mobile station. It should be understood that the data formatting is the same for a cell base station, however the modulation may be different.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a digital communication system in which digital data is transmitted in data frames of a preselected time duration, a method for formatting digital data in each data frame comprising the steps of:

providing a set of data bits of a first data type, said set of data bits of said first data type having a bit count corresponding to one of a plurality of predetermined bit counts;

generating a set of parity check bits for said set of data bits of said first data type when said bit count is a highest bit count or a next to highest bit count of said plurality of predetermined bit counts;

generating a set of tail bits in accordance with a predetermined frame termination format; and providing in respective order said set of data bits of said first data type, said parity check bits, and said tail bits in a data frame if said bit count is said highest bit count or said next to highest bit count;

otherwise, providing in respective order said set of data bits of said first data type and said tail bits in said data frame.

2. The method of claim 1 further comprising the steps of:

generating a mode bit; and providing said mode bit in said data frame preceding said set of data bits of said first data type.

3. The method of claim 2 further comprising the steps of:

providing a set of data bits of a second data type, wherein said set of data bits of said first data type are of a bit count less than said highest bit count;

wherein said mode bit is of a first bit value when only said set of data of said first data type are provided and of a second bit value when said set of data bits of said second data type are provided;

wherein when said set of parity check bits are generated, said set of parity bits are generated from said set of data bits of said second data type and said mode bit along with said set of data bits of said first data type;

providing in said data frame said set of data bits of said second data type immediately following said set of data bits of said first data type.

4. The method of claim 1 further comprising the step of:

providing a set of data bits of a second data type, wherein said set of data bits of said first data type are of said next to highest bit count;

wherein said set of parity check bits are generated from said set of data bits of said second data type along with said set of data bits of said first data type; and providing in said data frame said set of data bits of said second data type between said set of data bits of said first data type and said parity check bits.

5. A communication system for transmitting information in the form of a plurality of digital data types, comprising:

formatting means responsive to at least a first type of digital data and a second type of digital data for producing a data frame including a set of data bits;

generator means connected to the formatting means for:
generating parity check bits for the set of data bits in response to a particular bit count of data bits of a first data type in the set of data bits;
generating tail bits in accordance with a predetermined frame termination format;

providing in respective order in the data frame the set of data bits, the parity check bits when the set of data bits includes the particular bit count of data bits or the first data type, and the tail bits;

modulation means connected to the generator means for producing a modulated data frame by modulating the data frame according to a modulation procedure; and means connected to the modulation means for transmitting the modulated data frame.

6. The communication system of claim 5, wherein:
the particular bit count is a highest bit count or a next-to-highest bit count.

7. The communication system of claim 5, wherein:
the bit generator means is further for:
generating a mode bit in response to the particular bit count, the mode bit indicating a type of data bits in the set of data bits; and
providing in respective order, the mode bit, the data bits, the parity check bits when the set of data bits includes the particular bit count of data bits of the first data type, and the tail bits.

8. The communication system of claim 7, wherein the bit generator means is further for setting the mode bit to a first state when the set of data bits includes only data bits of the first data type.

9. The communication system of claim 8, wherein the bit generator means is further for setting the mode bit to a second state when the set of data bits includes data bits of a second data type.

10. The communication system of claim 9, wherein the bit generator means is for setting the mode bit to the second state when the set of data bits includes data bits of the first data type and data bits of the second data type.

11. The communication system of claim 9, wherein the bit generator means is for setting the mode bit to the second state when the set of data bats includes only data bits of the second data type.

12. The communication system of claim 9, wherein the bit generator means is for setting the mode bit to the second state when the set of data bits includes data bits of the second data type and data bits of a third data type.

13. The communication system of claim 9, wherein the data bits of the first data type represent voice information and the data bits of the second data type represent signaling information.

14. The communication system of claim 9, wherein the data bits of the first data type represent voice information and the data bits of the second data type represent user data.

15. The communication system of claim 5, further including a vocoder means connected to the formatting means for generating the first type of digital data, the first type of digital data including data bits of the first data type.

16. The communication system of claim 5, wherein the modulation procedure is a CDMA procedure.

17. In a cellular communication system which modulates and transmits data frames on forward and reverse channels, a combination for producing data frames, the combination comprising:

means for generating data frames in which each data frame includes a set of traffic bits, each set of traffic bits, each set of traffic data bits including data bits of one or more data types; and bit generator means connected to the means for generating data frames, the bit generator means for:
generating a mode bit indicating types of data bits for each data frame having a particular frame bit rate;
generating parity check bits for traffic for each data frame having a highest bit count or a next-to-highest bit count of data bits of a first data type;
generating tail bits in accordance with a predetermined frame termination format; and
providing in respective order:
said mode bit, said set of traffic data bits, said parity check bits and said tail bits for each frame having the particular frame bit rate and the highest bit count or next-to-highest bit count; and
said set of traffic data bits and said tail bits for all other data frames.

18. The combination of claim 17, wherein the data bits of the first data type are primary traffic data bits.

19. The combination of claim 17, wherein the mode bit indicates the set of traffic bits:
only data bits of the first data type;
only data bits of a second data type;
only data bits of a third data type;
only data bits of the first data type and data bits of the second data type; or
only data bits of the first data type and data bits of the third data type.

20. The combination of claim 19, wherein:
the data bits of the first data type represent voice data;
the data bits of the second data type represent signaling data; and
the data bits of the third data type represent user data.

21. A method for formatting data in a data frame, comprising the steps of:
receiving a first data packet;
generating a set of parity check bits in accordance with said first data packet when a bit count of said first data packet is a predetermined highest bit count;
generating a set of tail bits in accordance with a predetermined frame termination format; and
providing in respective order said first data packet, said parity check bits, and said tail bits in said data frame.

22. The method claim 21 further comprising the step of generating at least one indicator bit and wherein in said data frame said at least one indicator bit is provided preceding said first data packet.

23. The method claim 22 wherein said parity check bits are generated in accordance with said at least one indicator bit in addition to said first data packet.

24. The method of claim 21 further comprising the steps of:

receiving a second data packet;

generating said set of parity check bits in accordance with said second data packet in addition to said first data packet when a bit count of said first data packet is a predetermined second highest bit count; and wherein said predetermined bit count data of said second data packet is provided in said data frame following said first data packet.

25. The method claim 24 further comprising the step of generating at least one indicator bit and wherein in said data frame said at least one indicator bit is provided preceding said first data packet.

26. The method claim 25 wherein said parity check bits are generated in accordance with said at least one indicator bit in addition to said first data packet and said second data packet.

* * * * *